US008195668B2

(12) United States Patent
Drennan et al.

(10) Patent No.: US 8,195,668 B2
(45) Date of Patent: Jun. 5, 2012

(54) SYSTEM AND METHOD FOR PROVIDING ENHANCED MATCHING BASED ON QUESTION RESPONSES

(75) Inventors: Ricky J. Drennan, Wylie, TX (US);
Sharmistha Dubey, Coppell, TX (US);
Amanda W. Ginsberg, Dallas, TX (US);
Anna M. Roberts, Dallas, TX (US);
Marty L. Smith, Allen, TX (US);
Stanley E. Woodby, Jr., Dallas, TX (US)

(73) Assignee: Match.com, L.L.C., Dallas, TX (US)

( * ) Notice: Subject to any disclaimer, the term of this patent is extended or adjusted under 35 U.S.C. 154(b) by 569 days.

(21) Appl. No.: 12/205,463

(22) Filed: Sep. 5, 2008

(65) Prior Publication Data

US 2010/0077032 A1   Mar. 25, 2010

(51) Int. Cl.
*G06F 17/30* (2006.01)

(52) U.S. Cl. ......................... 707/748; 705/319
(58) Field of Classification Search .................. 707/748, 707/749; 705/319, 320, 321
See application file for complete search history.

(56) References Cited

U.S. PATENT DOCUMENTS

| 4,173,016 A | 10/1979 | Dickson |
| 4,789,907 A | 12/1988 | Fischetti et al. |
| 5,086,394 A | 2/1992 | Shapira |
| 5,164,897 A | 11/1992 | Clark et al. |
| 5,305,195 A | 4/1994 | Murphy |
| 5,606,361 A | 2/1997 | Davidsohn et al. |
| 5,623,660 A | 4/1997 | Josephson |
| 5,681,046 A | 10/1997 | Lawrence |
| 5,694,464 A | 12/1997 | Mashinsky |
| 5,696,981 A | 12/1997 | Shovers |
| 5,775,695 A | 7/1998 | Byers |
| 5,818,836 A | 10/1998 | DuVal |
| 5,832,432 A | 11/1998 | Trader et al. |
| 5,835,087 A | 11/1998 | Herz et al. |
| 5,850,428 A | 12/1998 | Day |

(Continued)

FOREIGN PATENT DOCUMENTS

DE    3508448 A1    3/1985

(Continued)

OTHER PUBLICATIONS

Art Fiore, JS Donath, "Online Personals: An Overview", CHI EA '04, ACM, New York, NY, 2004.*

(Continued)

*Primary Examiner* — Cheryl Lewis
*Assistant Examiner* — Nan Hutton
(74) *Attorney, Agent, or Firm* — Patent Capital Group

(57) ABSTRACT

In one example embodiment, an apparatus is provided that includes a central website that interfaces with one or more end users to establish a profile for each of the end users to be used in matching the end users to each other for a potential relationship. Information is provided in the profile and the information includes relevant characteristics of corresponding end users. A first end user is asked one or more questions after their profile is established, the questions being posed to a second end user whose respective profile has also been established and whose profile has already been matched to the first end user's profile. Answers for the questions from the first and second end users are compared and a subsequent message is sent to the first end user if the answers provided by the first end user and the second end user are compatible.

23 Claims, 46 Drawing Sheets

U.S. PATENT DOCUMENTS

| | | | | |
|---|---|---|---|---|
| 5,862,223 | A | 1/1999 | Walker et al. | |
| 5,884,270 | A | 3/1999 | Walker et al. | |
| 5,907,677 | A | 5/1999 | Glenn et al. | |
| 5,909,670 | A | 6/1999 | Trader et al. | |
| 5,950,200 | A | 9/1999 | Sudai et al. | |
| 5,956,716 | A | 9/1999 | Kenner et al. | |
| 5,963,951 | A | 10/1999 | Collins | |
| 5,996,006 | A | 11/1999 | Speicher | |
| 6,148,067 | A | 11/2000 | Leipow | |
| 6,181,867 | B1 | 1/2001 | Kenner et al. | |
| 6,185,532 | B1 | 2/2001 | Lemaire et al. | |
| 6,202,055 | B1 | 3/2001 | Houvener et al. | |
| 6,253,188 | B1 | 6/2001 | Witek et al. | |
| 6,272,467 | B1 | 8/2001 | Durand et al. | |
| 6,356,893 | B1 | 3/2002 | Itakura et al. | |
| 6,480,885 | B1 | 11/2002 | Olivier | |
| 6,564,213 | B1 | 5/2003 | Ortega et al. | |
| 6,633,885 | B1 | 10/2003 | Agrawal et al. | |
| 6,643,681 | B1 | 11/2003 | Saito et al. | |
| 6,647,355 | B2 | 11/2003 | Heinberg et al. | |
| 6,658,391 | B1 | 12/2003 | Williams et al. | |
| 6,735,568 | B1 * | 5/2004 | Buckwalter et al. | 705/319 |
| 6,775,775 | B1 | 8/2004 | Yoshiura et al. | |
| 6,857,024 | B1 | 2/2005 | Chen et al. | |
| 6,868,160 | B1 | 3/2005 | Raji | |
| 6,873,693 | B1 | 3/2005 | Langseth et al. | |
| 7,043,443 | B1 | 5/2006 | Firestone | |
| 7,069,308 | B2 * | 6/2006 | Abrams | 709/218 |
| 7,085,806 | B1 | 8/2006 | Shapira | |
| 7,092,952 | B1 | 8/2006 | Wilens | |
| 7,117,254 | B2 | 10/2006 | Lunt et al. | |
| 7,188,153 | B2 | 3/2007 | Lunt et al. | |
| 7,203,674 | B2 | 4/2007 | Cohen | |
| 7,246,067 | B2 | 7/2007 | Austin et al. | |
| 7,254,406 | B2 | 8/2007 | Beros et al. | |
| 7,264,474 | B2 | 9/2007 | Sullivan et al. | |
| 7,277,888 | B2 | 10/2007 | Gelormine et al. | |
| 7,342,503 | B1 | 3/2008 | Light et al. | |
| 7,394,388 | B1 | 7/2008 | Light et al. | |
| 7,401,098 | B2 | 7/2008 | Baker | |
| 7,613,706 | B2 | 11/2009 | Terrill et al. | |
| 7,617,134 | B2 | 11/2009 | Terrill et al. | |
| 7,676,466 | B2 | 3/2010 | Terrill et al. | |
| 8,010,546 | B2 | 8/2011 | Terrill et al. | |
| 8,010,556 | B2 | 8/2011 | Terrill et al. | |
| 8,051,013 | B2 | 11/2011 | Terrill et al. | |
| 8,117,091 | B2 | 2/2012 | Terrill et al. | |
| 2001/0031454 | A1 | 10/2001 | Mintz | |
| 2001/0048449 | A1 | 12/2001 | Baker | |
| 2002/0045154 | A1 | 4/2002 | Wood et al. | |
| 2002/0059369 | A1 * | 5/2002 | Kern et al. | 709/203 |
| 2002/0091556 | A1 | 7/2002 | Fiala et al. | |
| 2002/0103692 | A1 | 8/2002 | Rosenberg et al. | |
| 2002/0178057 | A1 | 11/2002 | Bertram et al. | |
| 2003/0088554 | A1 | 5/2003 | Ryan et al. | |
| 2003/0191673 | A1 | 10/2003 | Cohen | |
| 2004/0093334 | A1 | 5/2004 | Scherer | |
| 2004/0128148 | A1 | 7/2004 | Austin et al. | |
| 2004/0210661 | A1 | 10/2004 | Thompson | |
| 2004/0249811 | A1 | 12/2004 | Shostack et al. | |
| 2004/0260781 | A1 | 12/2004 | Shostack et al. | |
| 2005/0021750 | A1 | 1/2005 | Abrams | |
| 2005/0038876 | A1 | 2/2005 | Chaudhuri | |
| 2005/0060183 | A1 | 3/2005 | Haupt | |
| 2005/0153678 | A1 | 7/2005 | Tiberi | |
| 2005/0177528 | A1 | 8/2005 | Qamar | |
| 2005/0235062 | A1 | 10/2005 | Lunt | |
| 2006/0041401 | A1 | 2/2006 | Johnston | |
| 2006/0059130 | A1 | 3/2006 | Weiss et al. | |
| 2006/0059142 | A1 | 3/2006 | Zvinyatskovsky et al. | |
| 2006/0059147 | A1 | 3/2006 | Weiss et al. | |
| 2006/0059159 | A1 | 3/2006 | Truong et al. | |
| 2006/0106667 | A1 * | 5/2006 | Coyne | 705/10 |
| 2006/0121426 | A1 | 6/2006 | Scoresby et al. | |
| 2006/0126095 | A1 | 6/2006 | Tamura et al. | |
| 2006/0136498 | A1 | 6/2006 | Insley | |
| 2006/0149625 | A1 | 7/2006 | Koningstein | |
| 2006/0179111 | A1 | 8/2006 | Verona | |
| 2006/0287928 | A1 | 12/2006 | Terrill et al. | |
| 2007/0005750 | A1 | 1/2007 | Lunt et al. | |
| 2007/0030824 | A1 | 2/2007 | Ribaudo et al. | |
| 2007/0031800 | A1 | 2/2007 | Solomon | |
| 2007/0032240 | A1 | 2/2007 | Finnegan et al. | |
| 2007/0050354 | A1 | 3/2007 | Rosenberg | |
| 2007/0069901 | A1 | 3/2007 | Tuck et al. | |
| 2007/0072468 | A1 | 3/2007 | Terrill et al. | |
| 2007/0073548 | A1 | 3/2007 | Terrill et al. | |
| 2007/0073549 | A1 | 3/2007 | Terrill et al. | |
| 2007/0073687 | A1 * | 3/2007 | Terrill et al. | 707/6 |
| 2007/0073710 | A1 | 3/2007 | Terrill et al. | |
| 2007/0073711 | A1 | 3/2007 | Terrill et al. | |
| 2007/0073802 | A1 | 3/2007 | Terrill et al. | |
| 2007/0073803 | A1 | 3/2007 | Terrill et al. | |
| 2007/0112762 | A1 | 5/2007 | Brubaker | |
| 2007/0162458 | A1 | 7/2007 | Fasciano | |
| 2007/0233730 | A1 | 10/2007 | Johnston | |
| 2008/0059217 | A1 | 3/2008 | Austin et al. | |
| 2008/0222535 | A1 | 9/2008 | Zrike et al. | |
| 2008/0301557 | A1 * | 12/2008 | Kotlyar | 715/706 |
| 2009/0070133 | A1 | 3/2009 | Bonilla et al. | |
| 2010/0017375 | A1 | 1/2010 | Terrill et al. | |
| 2010/0017469 | A1 | 1/2010 | Terrill et al. | |
| 2010/0125530 | A1 | 5/2010 | Terrill et al. | |

FOREIGN PATENT DOCUMENTS

| | | |
|---|---|---|
| EP | 148406 B1 | 12/1984 |
| EP | 649121 B1 | 10/1994 |
| WO | WO 02/13053 A2 | 2/2002 |

OTHER PUBLICATIONS

H Chun, H Kwak, YH Eom, YY Ahn, S Moon, H Jeong, "Comparison of online relations in volume vs interaction: a case study of cyworld", IMC '08, ACM New York, 2008.*

Factiva, "MicroVoice, InterStep offer personals," Seybold Report on Publishing Systems, vol. 25, No. 21, 2 pgs., Jul. 29, 1996.

Factiva, "IBM Teams with Electric Classifieds," Seybold Report on Publishing Systems, vol. 25, No. 21, 1 pg., Jul. 29, 1996.

Neil Marks, "Home Alone and Wired for Romance," The Mail on Sunday, 1 pg., May 19, 1996.

Mitch Ratcliffe, Write once, publish many times: Electric Classifieds Inc.'s flexible publishing technology (middleware for online publishing), Digital Media, vol. 5, No. 3, ISSN: 1056-7038, 4 pgs., Aug. 7, 1995.

Factiva, "Desktop Video: VDOLive Will Enable Motion Video on the Internet; Conquers Internet's Technical Challenges & Will Make Desktop Video Broadcasting Applications Possible," Edge, 2 pgs., Nov. 6, 1995.

Factiva, "Electronic Classifieds: U S West Marketing Resources Teams with Denver's Rocky Mountain News," Edge, vol. 9, No. 323, ISSN: 0890-9563, 2 pgs., Oct. 3, 1994.

Ric Manning, "Singles Use Newest Approach: Multimedia," Louisville Courier-Journal, 2 pgs., May 3, 1994.

Factiva, "Nexpo '96 Preview: Something for Everyone in Las Vegas, part 6," Seybold Report on Publishing Systems, vol. 25, No. 17, 3 pgs., May 31, 1996.

Marco R. della Cava, "Truth in advertising hits Internet dating; Services help potential mates spot scammers," USA Today, ProQuest #62115951, 6 pgs., Apr. 20, 2004.

LookBetterOnline: Internet Archive Wayback Machine; www.archive.org; collection of web pages from http://lookbetteronline.com, 23 pgs., May 19, 2004, Jun. 14, 2004.

Notification of Transmittal of the International Search Report and the Written Opinion of the International Search Authority, or the Declaration (3 pgs.); Written Opinion of the International Searching Authority (5 pgs.), and International Search Report (4 pgs.) for International Application No. PCT/US 06/23518 mailed May 21, 2008.

Microsoft, "Immedient Improves and Streamlines Hiring with Microsoft Office Solution Accelerator for Recruiting," Published Sep. 2003, 4 pages.

Drogehorn et al., Personalised applications and services for a mobile user, Apr. 4-8, 2005, IEEE, 473-479 (7 pages).

Chen Zhou et al., DAML-QoS ontology for Web services, Jul. 6-9, 2004, IEEE 472-479 (8 pages).

Supjarerndee et al., Recruitment filtering with personality-job fit model, Apr. 8-10, 2002, IEEE, 6 pages.

Wilson et al., Design guidelines for parallel algorithms using continuous job profiles, Apr. 30,-May 2, 1991, IEEE, pp. 30-36.

Foner, L., "A Multi-Agent Referral System for Matchmaking," MIT Media Lab, 1996, (8 pages).

Baker, Frank, "Anthropological Notes on the Human Hand," American Anthropologist, vol. A1, Issue 1, Jan. 1888 (pp. 51-76).

Frodi, et al., "Fathers' and Mothers' Responses to Infant Smiles and Cries," Infant Behavior and Development, vol. 1, Jan. 1978 (pp. 187-198).

Zitzmann et al., "Testosterone Levels in Healthy Men and the Relation to Behavioural and Physical Characteristics: Facts and Constructs," European Journal of Endocrinology 144 (2001) (pp. 183-197).

* cited by examiner

FIG. 2A chemistry

Home | Help | Your Profile | Archives | Sign Out

| Home | New Matches | My Account | Interested in You | Active Matches | Email |

Summary  My Profile  Archives  My Personality Profile

Your Profile

Profile Details
Edit or update your profile. Allow 24 to 48 hours for your revised profile to be approved.
Edit Profile

Photo Gallery
Add new photos, delete photos, or change your primary photo. Allow 24 to 48 hours for approval.
Add/Edit Photos

Profile Activation
Activate your profile for matching, or make it inactive while you take a break.
Edit Preferences

Profile Visibility
Control how and when matches see your photos.
Edit Preferences How your profile appears to others:

Todd
30 yr old Man
Denver, Colorado

How We Match
Matches are based on our compatibility Personality Profile which identifies long-term relationship potential through variables such as similar or shared interests, values, backgrounds and goals.
more...

Next Step

Select your level of interest.

No Interest — Moderate — High Interest

Let us know your level of interest in this match.
Move the slider in either direction and then click next to continue.  Why is this important?

[ Next > ]

TO FIG. 2B

FROM FIG. 2A

Profile Summary

I'm a big believer in working hard and playing hard. Those who know me best appreciate my spontaneity, honesty, grin and ability to turn the ordinary into something great. Having a balance is important to me, and this shines through in not only my love for sports and hanging out with buddies, but also in my appreciation for the finer things in life. There are a million ways to describe the perfect match, but what I'm looking for is someone who appreciates the thousands of daily niceties that go into making a relationship work. I want a teammate, a best friend, someone to walk beside and behind and one in which our shared laughter gets us through the good times and bad.

Looking for: 25 to 45 year old Woman
within 50 miles of Denver, Colorado

Relationship history: Single (never been married)
Ethnic background: White/Caucasian
Body type: Athletic/toned
Height: 6'3" (190.5 cms)

Height 6'3" (190.5 cms)
Eyes: Brown
Build: Athletic/toned
Hair Color: Blonde
Full Profile

FROM FIG. 3A

You have a lot of energy. You think quickly, make decisions more easily than most, dislike unnecessary rules, and take a rational approach to people, issues and ideas.

You don't often enjoy "small talk." You are generally not interested in pleasing boring people and you gravitate to men and women who are intellectually exciting and get to their point quickly during conversations.

You are not conventional in most of your attitudes and values. You tend to be irreverent and pragmatic and you like spontaneous people. You can be an exciting, yet hard driving and exacting, friend and companion.

How your personality breaks out

Explorer - 25% of your personality
  Known for high energy and high creativity. Seeks novelty, risk and pleasure. Intellectually curious and not easily swayed by opinion.

Builder - 22% of your personality
  Usually very popular. Deep attachment to home and family. Calm demeanor, low anxiety. Often focused on achieving financial security.

Negotiator - 25% of your personality
  Excels at seeing the big picture, long-term planning, and consensus building. Quick witted. An intuitive thinker. Imaginative and nurturing.

Director - 26% of your personality
  Skilled at abstract thinking and short-term planning. Often assertive and quite competitive. Interested in rank and status. Easily makes people laugh.

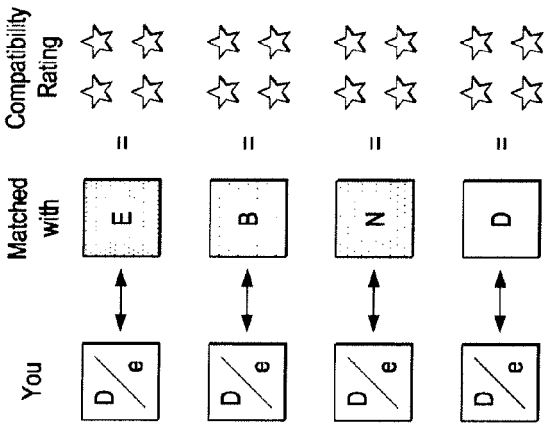

Universal Personality Traits
A globally accepted consensus of the five basic personality traits.

People with a HIGH degree of the following traits generally get along well with the personality types highlighted below.

FROM FIG. 3B

Extravert
Friendly, talkative and outgoing. Often takes on leadership roles. Comfortable around others, especially large groups.

You ▷ [====]   E  B  N  D

Agreeable
Easygoing in nature. Can be tolerant and accommodating of others. Interested in creating harmony and building consensus.

You ▷ [====]   E  B  N  D

Conscientious
Determined to meet or exceed stated goals. Disciplined and extremely focused at work. Not easily distracted.

You ▷ [====]   E  B  N  D

Open to New Experiences
Interested in innovation, experimentation and new solutions. Willing to try new experiences. Creative, original thinker.

You ▷ [====]   E  B  N  D

Emotional Stability
Strong and steady, not easily upset. Level-headed in response to unforeseen changes or problems. Calm, cool and collected.

You ▷ [====]   E  B  N  D

FIG. 3D
RELATIVE LENGTH OF INDEX vs. RING FINGERS, BY PERSONALITY TYPE
RING FINGER LONGER
RING SAME AS INDEX
| NEGOTIATOR | EXPLORER | BUILDER | DIRECTOR |
|---|---|---|---|
| 2.2 | 2.3 | 2.4 | 2.5 |
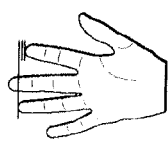
INDEX FINGER SIGNIFICANTLY SHORTER THAN RING FINGER
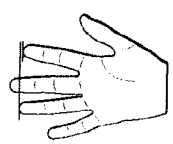
INDEX FINGER SLIGHTLY SHORTER THAN RING FINGER
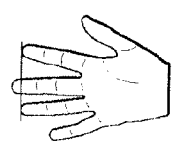
INDEX FINGER ABOUT THE SAME LENGTH AS RING FINGER
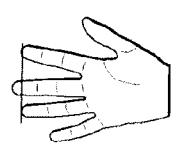
INDEX FINGER IS SLIGHTLY LONGER THAN RING FINGER
RELATIVE LENGTH

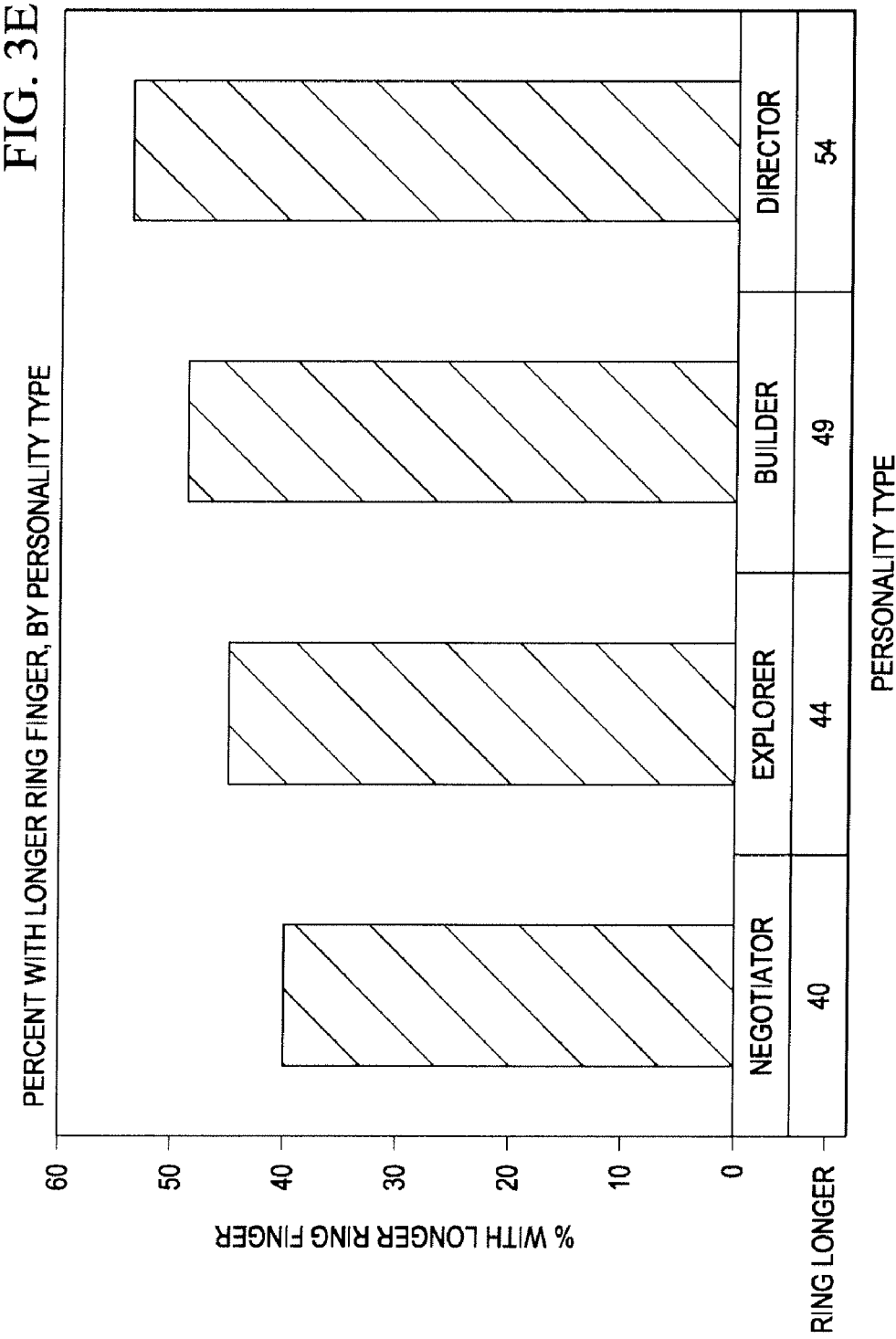

FIG. 3F

| | MEANS | | |
|---|---|---|---|
| | RELATIVE LENGTH | | STD. DEVIATION |
| NEGOTIATOR | 2.2 | 549 | 1.028214 |
| EXPLORER | 2.3 | 545 | 1.016964 |
| BUILDER | 2.4 | 564 | 1.048758 |
| DIRECTOR | 2.5 | 342 | 1.073901 |

FIG. 3G

| | PERCENT | |
|---|---|---|
| | RING LONGER | INDEX LONGER/EQUAL |
| NEGOTIATOR | 40 | 60 |
| EXPLORER | 44 | 56 |
| BUILDER | 49 | 51 |
| DIRECTOR | 54 | 46 | chemistry

Home | Help | Your Profile | Archives | Sign Out

Tabs: Home | New Matches | My Profile | My Account | Archives | Interested in You | My Personality Profile | Active Matches | Email Summary

Welcome Back Todd

Will this be the day you find that someone special? Find out here - preview your new matches, find out who is interested in you, learn more about your active matches, and build ongoing relationships through email.

New Matches
2 New Matches
View profiles custom-selected for you based on your Personality Profile and your interests. more...
[Go]

Interested in You
0 New Matches
See who has reviewed your profile and expressed interest in getting to know you better. more...
[Go]

Active Matches
14 New Alerts
Exchange information via our four-stage communication process. more...
[Go]

Email
1 New Message
Send and receive messages through our two-way anonymous email system. more...
[Go]

We Need Your Help
Welcome to the beta version of our site. Over the next few weeks, we will use your feedback to improve the way it works and the way it looks. Take a moment to let us know what you think. more...

Put Your Best Foot Forward
Expert advice on creating the perfect profile, selecting the right photo, and what to say - and not say - in that first email. more...

FIG. 4

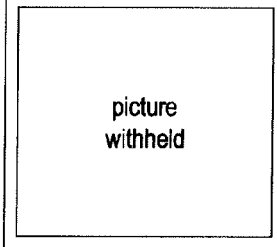

"INTERESTED IN YOU" COMPONENT

| NEW MATCHES | NEW MATCHES |
|---|---|
| TODD | BROOKE |
| 1. MARSHELL | 1. JAY |
| ✗ 2. BROOKE | 2. THOMAS |
| 3. PAM | 3. CHRIS |
| 4. ALISA | 4. ALEX |
| 5. ALAINA | 5. KEVIN |
| 6. MICHELLE | 6. JIM |
| 7. ROSEANNE | 7. BILL |
| 8. DONNA | ✗ 8. TODD |
| 9. MARY | 9. BOB |
| 10. CANDACE | 10. CHET |

FIG. 5C

FIG. 6A chemistry

| Home | | | | | | Home  Help  My Profile  Archives  Sign Out |

| My Home | New Matches | My Profile | My Account | Interested in You | My Archives | Active Matches | My Personality Profile | Email |

Core Characteristics

In your family, which one are you?
- ○ Oldest child
- ○ Middle child
- ○ Youngest child
- ○ Only child When do you worry most about a major purchase?
- ○ It depends
- ○ Before making the purchase
- ○ While making the purchase
- ○ After making the purchase Describe yourself. To what degree are you:

FIG. 6B chemistry

| Home | New Matches | Interested in You | My Account | Archives | Home Help My Profile Archives Sign Out |
|---|---|---|---|---|---|
| My Home | My Profile | My Archives | Active Matches | My Personality Profile | Email |

Universal Traits

To what degree are you:

| | A little | Quite a bit | Very much | Completely |
|---|---|---|---|---|
| Talkative | O | O | O | O |
| Enthusiastic | O | O | O | O |
| Outgoing | O | O | O | O |
| Helpful | O | O | O | O |
| Forgiving | O | O | O | O |
| Kind | O | O | O | O |
| Organized | O | O | O | O |
| Thorough in completing tasks | O | O | O | O |
| An efficient worker | O | O | O | O |
| Creative | O | O | O | O |
| A thinker | O | O | O | O |
| Interested in new experiences | O | O | O | O |
| Calm and relaxed | O | O | O | O |

FIG. 6C

FIG. 6E chemistry

Home  Help  My Profile  Archives  Sign Out

| Home | New Matches | Interested in You | Active Matches | Email | First Meetings |

Dating Tips for Negotiators

- In the beginning of a relationship, try not to over think the situation or over-react to minor set backs. If there's chemistry and compassion, it will all work out.
- You may be so diplomatic that your potential partner is unclear who you are. Take a chance at being more direct and decisive.
- Rather than waiting for the right moment, interrupt now and then with some of your imaginative and broad-minded ideas; it can lead to sparkling, involved conversation and close companionship.
- Let a potential partner know your boundaries, needs and hopes. This way he or she will be able to act accordingly to deepen the bond.
- Talking is only one form of intimacy. Try doing something side by side with him or her, particularly something new and collaborative.

What does it mean? About the test

What does your hand say about you?

Testosterone builds the length of the fourth (right) digit in the womb. The longer your ring finger (in relation to your pointing finger) the more you are likely to have mathematical, mechanical and/or musical skills.

Reading people's faces

The first two smiles are genuine, because they are accompanied by crow's-feet wrinkles around the eyes and a slight dip in the eyebrows. The ability to "read" faces is associated with the hormone estrogen in both women and men and is often linked with empathy.

What's he doing?

Curiosity is associated with the activity of dopamine (a natural stimulant) in the brain. It is often linked with spontaneity and creativity.

What would you do? Adventurous, risk taking men and women are generally uncomfortable with public displays of affection or the open expression of feelings by others. Risk taking is associated with the brain chemical, dopamine.

FIG. 6F

FIG. 6G chemistry

Home | New Matches | Interested in You | Active Matches
My Home  My Profile  My Account  My Archives  My Personality Profile Home  Help  My Profile  Archives  Sign Out Email More About Your Match Which ethnic backgrounds are you willing to consider? Check all that apply.

☐ American Indian or Alaska Native    ☐ Native Hawaiian or other Pacific Islander
☐ Asian                                ☐ White/Caucasian
☐ Black or African American            ☐ Other
☐ Hispanic/Latino or Spanish origin    ☐ Any
☐ Middle Eastern How important is this?    Not important ——— Somewhat ——— Very important Which religious affiliations are you willing to consider? Check all that apply.

☐ Agnostic    ☐ Hindu
☐ Atheist     ☐ Jewish

FIG. 6H chemistry

Home | New Matches | My Profile | My Account | My Archives | Interested in You | Active Matches | My Personality Profile Home  Help  My Profile  Archives  Sign Out Email

Physical Fitness

Is exercise an important part of your daily routine, or something that you get around to every once in a while?

Step One: Use the About You slider to indicate how important physical fitness is in your life.

Step Two: Use the About Your Match slider to indicate the level of fitness you seek in your ideal partner.

Very Fit ←→ Not Fit
About You

Not Fit ↕ Very Fit
About Your Match

Save and Continue ▷

FIG. 6I chemistry

Home    Home   Help   My Profile   Archives   Sign Out

My Home | My Profile | My Account | My Archives

New Matches | Interested in You | Active Matches | My Personality Profile | Email

Profile Headline And Essay

Your profile headline (2 characters min., 128 characters max.)
128 characters remaining Tell us about yourself and who you're looking for. (200 characters min., 2000 characters max.)
2000 characters remaining

FIG. 6K chemistry

Home | Help | My Profile | Archives | Sign Out

| Home | New Matches | Interested in You | Active Matches | Email |

You are a DIRECTOR/explorer

You are courageous and you seek challenges. You are a tough-minded, independent and daring thinker who likes to explore ideas or problems thoroughly. You focus easily, and are persistent, systematic and competent in pursuing your interests and goals.

You are also assertive and you enjoy the opportunities your hard work wins.

You have a lot of energy. You think quickly, make decisions more easily than most, dislike unnecessary rules, and take a rational approach to people, issues and ideas.

You don't often enjoy "small talk". You are generally not interested in pleasing boring people and you gravitate to men and women who are intellectually exciting and get to their point quickly during conversations.

You are not conventional in most of your attitudes and values. You tend to be irreverent and pragmatic and you like spontaneous people. You can be an exciting, yet hard driving and exacting, friend and companion.

Liz is an EXPLORER/negotiator

Liz is a highly spontaneous person who likes to try new things. Novel and unpredictable situations don't bother her; instead Liz finds them challenging and exciting.

Liz tends to be focused and resourceful and is able to juggle a lot of projects at the same time; as a result Liz is sometimes a whirlwind of activity.

Liz has a firm grip on reality and enjoys living in the present tense. But Liz has a keen imagination that enables her to lift off from time and space and be remarkably creative.

Liz is humorous and likes entertaining others.

Liz has a deep sense of compassion and is able to show genuine insight into the needs of others, is good at listening and talking, and expresses a genuine desire to be helpful.

Liz is easy-going. Her tolerance for others and their beliefs, her lack of prejudice, her ability to compromise and her occasional antics make Liz popular with others and a great companion.

FIG. 6L chemistry

Home  Help  My Profile  Archives  Sign Out

[ Home | New Matches | Interested in You | Active Matches ]  [ Email ]

Your Personality Traits: How You Complement Liz

The five personality traits featured below are generally accepted as the "Big Five", or traits that are common to all of us to some degree.

Take a look at how you and Liz compare in your responses.

Extravert
Friendly, talkative and outgoing. Often takes on leadership roles. Comfortable around others, especially large groups.

You
　　　　　　　　　　　　　　　　　　　△▽
　　　　　　　[================]
　　　　　　　　　　　　　　　　Liz

Agreeable
Easygoing in nature. Can be tolerant and accommodating of others. Interested in creating harmony and building consensus.

You
　　　　　　　　　　　　　△▽
　　　　　　　[================]
　　　　　　　　　　　　　Liz

Conscientious
Determined to meet or exceed stated goals. Disciplined and extremely focused at work. Not easily distracted.

You
　　　　　　　　　　　　　　　　　　　△▽
　　　　　　　[================]
　　　　　　　　　　　　　　　　　Liz

Open to New Experiences
Interested in innovation, experimentation and new solutions. Willing to try new experiences. Creative, original thinker.

You
　　　　　　　　　　　　　　　　　△▽
　　　　　　　[================]
　　　　　　　　　　　　　　　　Liz

Emotional Stability
Strong and steady, not easily upset. Level-headed in response to unforeseen changes or problems. Calm, cool and collected.

You
　　　　　　　　　　　　　△▽
　　　　　　　[================]
　　　　　　　　　　　　　Liz

FIG. 6Q chemistry

| Home | New Matches | Interested in You | My Account | | My Home | Help | Profile | Archives | Sign Out |

My Home  My Matching Criteria  My Profile  My Account  My Chemistry Profile

| | Email | First-Meetings | Active Matches |

Welcome Back Anna

5 NEW MATCHES
Take a look at your chemistry-
inspired matches.  learn more >>

[ CHECK THEM OUT ▶ ]

54 PEOPLE ARE INTERESTED IN YOU
See who's interested in getting
to know you.  learn more >>

[ START FLIRTING ▶ ]

NEW! YOU'VE BEEN NOTICED BY 21 PEOPLE

[ TAKE A PEEK ▶ ]

9 ACTIVE MATCHES [ 5 UPDATES ]
Keep up with the matches
you're into.  learn more >>

[ GET TO KNOW ▶ ]

Your profile Edit
Anna 26 Years Old and in
Dallas, Texas
Add/edit photos
My account Your personality type is: EXPLORER/Negotiator
Explorers love novelty, excitement and
adventure. Learn more NEW! hidden chemistry
Jolly good! Hearing a British accent could
lead to some serious snogging between you
and Christopher. What else do you both
fancy? View Christopher's profile and find out.
Answer questions >>     Learn more >>

Christopher, 28
Carrollton, TX
[ VIEW ]

Quick Links   View Email [ 0 ]   View Archives how it works  |  site map  |  about us  |  media center  |  affiliates  |  terms of use  |  privacy  |  contact us  |  local  |  help

FROM FIG. 8B-1

Nick
Plano, TX
40

Director/Builder

Just looking
In search of a passionate, worldly date/husband. Like sane, clean, professional, fit men, in that order. Age and race no...

Michael
Dallas, TX
42

Explorer/Negotiator

Professional Musician Available for Duet
I'm 41. I have had two serious relationships. One lasting nine years, the second about a year and a half. I've been sing...

Page 1 of 1

| how it works | site map | about us | media center | affiliates | terms of use | privacy | contact us | local | help |

FIG. 8B-2

FIG. 8C-1 chemistry

| Home | New Matches | Interested in You | Active Matches | Email | First-Meetings |

My Home   Help   Profile   Archives   Sign Out

Hey Clark, 17 new women are into you!

We sent your profile to these women whose chemistry we knew would click well with yours. And of course they're all curious to find out more about you.

You have 17 people interested in You

Imagine how many more you'd have if you added a photo. Add a photo >>

Nudge (?)

| Name / Location / Age | Personality Type | Personal Description |
|---|---|---|
| Irina<br>Greenwood Village, CO.<br>35 | Explorer/Director | New to this...<br>So what's it like to date in Denver? :) I just moved to the city a few months back and would like to meet a like-minded... |
| Carrie<br>Fort Collins, CO<br>31 | Negotiator/Explorer | Tired of playing games, looking for someone real...<br>I am an outgoing, caring person. I love going to live music concerts, and yes my favorite is the Dave Mathews Band... |
| Christy<br>Wheat Ridge, CO<br>35 | Builder/Negotiator | Me in a nutshell<br>Where does one begin? Here are a few of my interests: country dancing (even though I don't know how, fishing d... |

| | | |
|---|---|---|
| Diane<br>Northglenn, CO<br>31 | Builder/Explorer | Sassy girl looking for witty mate!!!<br>I am a Colorado Native, and I believe the most important thing to do in life is live each day to the fullest and above a... |
| Christina<br>Denver, CO<br>28 | Director/Negotiator | Just a girl looking for a connection<br>I have a great personality with a killer sense of humor. One thing I pride myself is my ability to make people laugh. I... |
| Nicole<br>Golden, CO<br>32 | Builder/Explorer | I like to have fun and want to meet someone with t...    SHE<br>I would describe myself as intelligent funny, successful,  NUDGED<br>dependable, independent, and loyal. I love to cook and...    YOU |
| Charlene<br>Aurora, CO<br>33 | Explorer/Negotiator | Looking for a real man...<br>I am looking for a man who is real and about his woman, not about woMEN. I have alot to offer and love to give my man... |
| Laura<br>Highlands Ranch, CO<br>25 | Builder/Negotiator | Lets have some fun.<br>I'm looking for someone who I enjoy spending time with, whether we're catching a game at the ball park, camping or watc... |
| Tabitha<br>Littleton, CO<br>31 | Negotiator/Builder | Laugh at life and this crazy world we live in<br>Ideally I think laughter and, sometimes, silliness are a good way to deal with the curve balls that life throws at you... |

FIG. 8C-3

FROM FIG. 8C-2

Amber
Northglenn, CO
33
Negotiator/Builder

Perfect tulip for you!
I'm most passionate about living life to the fullest, the ability to give (and receive) affection, the outdoors, a great...

Serena
Denver, CO
28
Explorer/Negotiator

HI! :)
The basics about me: I am lucky to be a Denver native and think it is a great place to be from and live. I love to go on...

Ming
White Plains, NY
32
Explorer/Builder

Life is short, I want a partner who can enjoy the happ...
I would describe myself as feminine, sweet, intelligent, sensitive, passionate, bright, flexible and easy going. I am ha...

Laura
Denver, CO
29
Builder/Director

Teacher Trouble?
Hey there! I am an elementary school teacher who moved from California 6 years ago. More than just looking for a date, I am loo...

Amber
Englewood, CO
25
Negotiator/Director

Painted Lady Seeking Artist
By day I am a mild mannered all around office monkey, and by night... well. I'm still a fairly mild mannered aspiring au...

Keri
Denver, CO
34
Negotiator/Builder

LovinColorado
I am a kind, compassionate single mom. I enjoy my job, but my family and friends are my priority. I have a generous natu...

FROM FIG. 8C-3

Jennifer
Parker, CO
29

Builder/Negotiator

Hi there!
I'm a fun loving, easy going gal. I love to laugh and try to enjoy life as much as possible. I work hard and enjoy my do...

Caitlin
Denver, CO
24

Explorer/Negotiator

What's in a name? That which we call a rose by an...
I come from a small town, and appreciate many of the values it instilled in me... but I also love living in Denver...

Page 1 of 1

The following profiles have been removed.

Elise
Denver, CO
27

This match is no longer available how it works | site map | about us | media center | affiliates | terms of use | privacy | contact us | local | help

FIG. 8D

SYSTEM AND METHOD FOR PROVIDING ENHANCED MATCHING BASED ON QUESTION RESPONSES

TECHNICAL FIELD OF THE INVENTION

This invention relates in general to the field of communications and, more particularly, to a system and a method for providing enhanced matching based on question responses.

BACKGROUND OF THE INVENTION

Electronic architectures have experienced significant notoriety because they can offer the benefits of automation, convenience, and data management for their respective online communities. Certain network protocols may be used in order to allow an end user to be matched to other end users or to scenarios in which they stand to benefit (e.g., job searches, person-finding services, real estate searches, online dating, etc.).

One problem facing service providers in this arena is inactivity by the end users in their respective online communities. When end users are not being active in reviewing information they are sent, they can inhibit their own online experiences. Participation is a significant contributor to online customer satisfaction. Thus, the ability to encourage these end users to be involved in a given service, which is fostered by their own contributions, offers a significant challenge to website operators, component manufacturers, service providers, and system designers alike.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIGS. 2A-B are simplified screen shots of an example profile to be used in the online dating service;

FIGS. 3A-C are simplified screen shots involving an example personality profile to be used in the online dating service;

FIGS. 3D-G are simplified diagrams and statistical illustrations that depict some of the personality identification techniques and resultants of example embodiments of the present invention;

FIG. 4 is a simplified screen shot of an example home page for an end user of the online dating service;

FIGS. 5A-B are simplified screen shots of an example "Interested In You" profile to be used in the online dating service;

FIG. 5C is an example schematic that shows how the "Interested In You" component can operate in one implementation;

FIGS. 7A-7H illustrate example screen shots of the way in which a Hidden Chemistry feature of the system may operate;

FIGS. 8A-8D are simplified screen shots illustrating various potential tabs of the system in accordance with one example embodiment of the present invention.

DETAILED DESCRIPTION OF EXAMPLE EMBODIMENTS

Overview

In one example embodiment, an apparatus is provided that includes a central website that interfaces with one or more end users to establish a profile for each of the end users to be used in matching the end users to each other for a potential relationship. Information is provided in the profile and the information includes relevant characteristics of corresponding end users. A first end user is asked one or more questions after their profile is established, the questions being posed to a second end user whose respective profile has also been established and whose profile has already been matched to the first end user's profile. Answers for the questions from the first and second end users are compared and a subsequent message is sent to the first end user if the answers provided by the first end user and the second end user are compatible.

Figure 1:
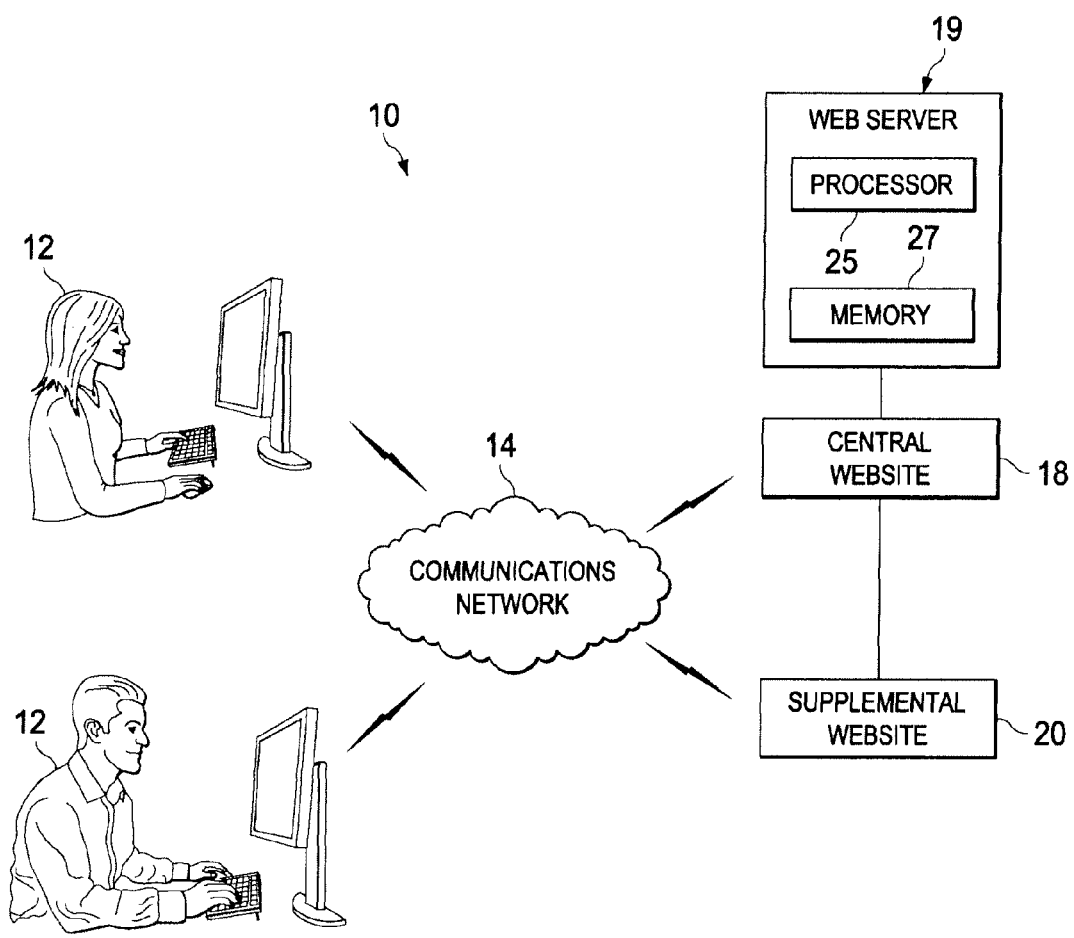
FIG. 1 is a simplified block diagram of a system for providing an online dating service in accordance with one embodiment of the present invention.

FIG. 1 is a simplified block diagram of a system 10 for facilitating an online dating scenario in a network environment. In other embodiments, system 10 can be leveraged to identify and to evaluate suitable candidates in other areas (e.g., hiring/employment, recruiting, real estate, general person searches, etc.). FIG. 1 includes multiple end users 12, a communications network 14, a central website 18 (which can include a web server 19 that could potentially include a processor 25 and a memory 27), and a supplemental website 20 (which could include similar hardware [e.g., a processor and memory]). FIG. 1 may be configured such that inter and intra-communications are readily achieved by any of the components included therein. The present invention is capable of providing both an online component (as illustrated by FIG. 1) and an off-line component (as described below) such that one or more end users can meet, gather information, resolve to meet, and then subsequently meet in person with the assistance of system 10. Ancillary components to such a comprehensive process may involve pre-date profiles, post-date follow-ups, and a myriad of other significant features, as outlined in detail below.

System 10 can be used to offer a multitude of unique features and capabilities to a group of end users. A brief summary of some of these features is offered immediately below. Additional details relating to each of these tools is discussed more fully with reference to the accompanying FIGURES.

A first feature provided by system 10 relates to a Hidden Chemistry component, which may include the use of a Quizlet. The Quizlet can solicit current and new information about the end user, while urging the end user to evaluate other candidates on a given online platform. For example, the end user could be asked some questions that reveal something interesting or personal about the end user. These probing questions could be delivered by a floating screen module that automatically is displayed each time the end user logs into the system (or simply accesses the online platform).

The actual questions of the Quizlets could be virtually anything, such as something topical (e.g., based on a current event). Other questions could solicit end user interests, such as: "What's your favorite accent?" or "What's your favorite food?" The length of the Quizlet could be a single question or multiple questions or involve pictures, images, fill in the blank exercises, a narrative, or a matching exercise. Quizlets could also include a simple audio message, or a brief video, or video and/or audio could accompany any of the written Quizlets offered to end users. Quizlets can be systematically broadcasted to end users in the online community based on any given criteria (e.g., inactivity by the end users in not reviewing the potential matches being served up to the end user). The answers to the Quizlets can be used to highlight compatibility (e.g., similarities) between a given end user and other users. Note that where answers reveal potential connections, the answers could be similar or just compatible with each other. In one example, the comparisons are made between the end user and the matches that were already found for this particular end user (i.e., the end users are already part of the "New Matches" queue). In this sense, the end user is being urged to review another end user who seems to be a good match for this end user and this match is being further reinforced by the Quizlet responses.

A second feature provided by system 10 relates to multi-tiered questions. Along the dating continuum, several levels of questions are proffered for the end user. During the unique questioning protocol, preferred answers are selected by one candidate and then the other potential candidate receives the questions that include these answers. The questions/stages can be completed in pairs. The results are then displayed in a novel way, whereby selections from one candidate are illustrated along with the other candidate's responses. This scale (or seesaw configuration) readily displays the differences, the range of differences, and/or the congruency in the answers. Note that the "Not Interested" bar is displayed throughout the dating process such that the end user can exit the romantic pursuit at any given time. The discussion of this second feature is amenable to detailed illustrations, which are discussed below.

A third feature provided by system 10 relates to a resolution to a meeting. Lacking in most system is any method for facilitating a meeting after the first three stages of interaction have been finished. System 10 addresses this void by offering a pre-date profile for the participants to complete. Optimal date, time, cuisine, and other preferences can be solicited from both parties. Once a mutually agreeable date has been planned, the parties are invited to meet at the proposed time, place, and location. In a particular embodiment, during the course of the date, a courtesy phone call may be placed to either of the participants (or a specific participant at their request) in order to indicate that the date has ended. Note that a first date may only be for coffee; so once the allotted time has passed, the meeting should conclude. In another embodiment, such a call could be used to provide a graceful exit for a party who is experiencing an uncomfortable situation.

A fourth feature provided by system 10 relates to a post-date evaluation. Once the date is completed, the parties can return to the site and fill out a post-date follow up evaluation. This may be inclusive of questions that relate to appearance, punctuality, chemistry, etc. A sampling of these questions is provided and discussed below with reference to corresponding FIGURES. A second date solicitation could also readily be provided at this point along the dating timeline. Additionally, a dating report card could be provided to each of the end users. This could be done in order to provide benign, constructive feedback to an end user, who may be experiencing difficulty in one particular facet of his dating approach (e.g., the end user may be counseled to focus on being a better listener).

A fifth feature provided by system 10 relates to an "Interested in You" component. The "Interested in You" component is broken into two segments: 1) Match List; and 2) Interested in You. Other online dating platforms simply populate matches concurrently. In the architecture of system 10, the interest level is separated from the "want to meet" element. The other candidate only receives an e-mail if the interest level is positive (e.g., greater than 7 [scale 1-10]). Negative interest levels are not communicated to the other potential match. These functionalities can be better understood with reference to accompanying illustrations and the discussions that are provided below.

A sixth feature provided by system 10 relates to a limited search, which can be conducted by a participant. The limited search may be somewhat constricted (e.g., only one limited search per day). The limited search capability would allow an end user to seek out individuals having an exact qualification or a specific characteristic. This would achieve a level of granularity for the end user, who may have precise criteria for choosing a romantic interest to pursue. Additional platform tools, capabilities, and features are provided below and are discussed with reference to accompanying FIGURES. These elements are described immediately following the subsequent description of the components of the architecture of FIG. 1.

A seventh feature provided by system 10 relates to a "Level of Interest Rating." An end user is provided with a web prompt (e.g., a slider bar), which solicits the end user's interest level of a potential candidate. The scale can range from "No Interest" to "High Interest" or system 10 can use any other gradation where appropriate. Such an interest-ometer stands in stark contrast to other rudimentary systems in which a simple match is generated based on profile information. Moreover, prior architectures process according to strict compatibility, but fail to accommodate the interest component. Consider the case where a person's profile information would suggest one potential mate, but their interest bar resultants yield an attraction to a completely different type of individual. System 10 effectively accounts for such a discrepancy (and others) in offering a superior method of matching two individuals.

The indicated interest can be sent to system 10 and, further, be used in additional processing for this end user. In such a scenario, feedback from the interest bar can be aggregated, compiled, and processed for the future coordination of potential matches. Hence, a reevaluation protocol is facilitated by continuing to leverage results from the interest bar.

An eighth feature provided by system 10 relates to intelligently matching based on personality type identification. Statistically, personality types will respond differently to a given question (or a set of questions). In particular examples, as detailed below, questions are being used by system 10 (e.g., an administrator of system 10) to solicit important end user feedback that will be used to enhance the matching process. As a separate feature, but similarly powerful tool, personality types routinely use certain words to express themselves. A statistical correlation has been found between users expressing themselves with selected words and their individual personality types. Thus, system 10 can leverage this knowledge and conduct evaluations to interpret a person's word choice in gleaning insight into their specific personality types. Once the personality type is accurately identified, then relationship rules may be employed/accessed to attempt to connect two end users.

In one example set of relationship rules, Explorers are attracted to other Explorers, Negotiators are attracted to other Negotiators, while Directors are attracted to Builders and vice versa. [Each of these individual personality types is explained in detail below.] These relationship rules, which are addressing general compatibility findings, can be used to better position end users in circumstances in which they are more likely to succeed. In terms of a more specific example (such as online dating), these attraction patterns allow for better matching between individuals. Furthermore, the personality determination can be used in conjunction with profile information (potentially inclusive of end user preferences) to connect two or more end users in an ideal fashion. Furthermore, an administrator is afforded the ability to weight these components (profile, personality determination, end user preferences, etc.) in order to refine the matching process.

Turning back to the infrastructure of FIG. 1, end users 12 are clients, customers, prospective customers, or entities wishing to participate in an online dating scenario and/or to view information associated with other participants in the system. End users 12 may also seek to access or to initiate a communication with other users via communications network 14. End users 12 may review data (such as profiles for example) associated with other users in order to make matching decisions or elections. Data, as used herein in this document, refers to any type of numeric, voice, video, or script data, or any other suitable information in any appropriate format that may be communicated from one point to another.

In one embodiment, end user 12 represents (and is inclusive of) a personal computer that may be used to access the Internet. Alternatively, end user 12, as illustrated in FIG. 1, may be representative of a cellular telephone, an electronic notebook, a laptop, a personal digital assistant (PDA), or any other suitable device (wireless or otherwise: some of which can perform web browsing), component, or element capable of accessing one or more elements within system 10. An end user interface, which may be provided in conjunction with the items listed above, may further comprise any suitable interface for a human user such as a display, a video camera, a microphone, a keyboard, a mouse, or any other appropriate terminal equipment according to particular configurations and arrangements. In addition, the end user interface may be a unique element designed specifically for communications involving system 10. Such an element may be fabricated or produced specifically for matching applications involving end user 12.

Communications network 14 is a communicative platform operable to exchange data or information emanating from end user 12. Communications network 14 represents an Internet architecture in a particular embodiment of the present invention, which provides end user 12 with the ability to electronically execute or to initiate actions associated with finding a potential candidate. Alternatively, communications network 14 could be a plain old telephone system (POTS), which end user 12 could use to perform the same operations or functions. Such transactions may be assisted by management associated with central website 18 or manually keyed into a telephone or other suitable electronic equipment. In other embodiments, communications network 14 could be any packet data network (PDN) offering a communications interface or exchange between any two nodes in system 10. Communications network 14 may alternatively be any local area network (LAN), metropolitan area network (MAN), wide area network (WAN), wireless local area network (WLAN), virtual private network (VPN), intranet, or any other appropriate architecture or system that facilitates communications in a network or telephonic environment.

Central website 18 is a server (in one embodiment [e.g., web server 19]) that is operable to receive and to communicate information to end user 12. Alternatively, central website 18 may be any switch, router, gateway, processor, component, object, or element operable to facilitate communications involving end user 12. In one particular embodiment, central website 18 is engaged in facilitating interaction(s) between parties interested in seeking a romantic partner (i.e. online dating). For example, central website 18 can be online dating service provider www.Match.com. In other embodiments, central website 18 is any website or architecture interested in facilitating a connection involving two or more people, and which may make use of a given photograph. This could include services associated with job placements, escort services, real estate, recruiting services (e.g., in athletics or in academic settings), etc.

Supplemental website 20 is a server (in one embodiment) that is operable to receive and to communicate information to end user 12. Alternatively, supplemental website 20 may be any switch, router, gateway, processor, component, object, or element operable to facilitate communications involving end user 12. In one particular embodiment, supplemental website 20 is operable to perform processing functions for central website 18. For example, supplemental website 20 can be used to coordinate scheduling, execute matching algorithms, assist in uploading or downloading large pieces of data, implement billing protocols for end users, etc. Supplemental website 20 can alleviate any of the processing loads present in the network.

A link may be provided on either central website 18 or supplemental website 20 (or on both) such that a given end user can be immediately directed to the other site. While one embodiment offers a connection between these two sites, these two sites may be completely independent of each other in other embodiments, where independent entities operate these sites. In the case that these two sites are operable to communicate with each other, a secure connection can be provided in order to maintain the integrity of the information propagating between the sites and to protect the privacy of the individuals implicated by the communications.

With regard to the specific items that effectuate the teachings of the present invention, central website 18 and/or supplemental website 20 may include software and/or algorithms to achieve the operations for processing, communicating, delivering, gathering, uploading, maintaining, and/or generally managing data, as described herein. This includes suitably displaying some or all of these items. Alternatively, such operations and techniques may be achieved by any suitable hardware, component, device, application specific integrated circuit (ASIC), additional software, field programmable gate array (FPGA), server, processor, algorithm, erasable programmable ROM (EPROM), electrically erasable programmable ROM (EEPROM), or any other suitable object that is operable to facilitate such operations.

Considerable flexibility is provided by the structure of central website 18 and supplemental website 20 in the context of system 10. Thus, it can be easily appreciated that such functions could be provided external to central website 18 and supplemental website 20. In such cases, such a functionality could be readily embodied in a separate component, server, processor, device, or module. Note that these online dating features and capabilities may be provided in just one of these elements, in both, or distributed across both of them. Hence, in certain embodiments, the online dating operations may be consolidated in a single website, where no redirection is needed, nor performed for the user.

In one example, software that resides in web server 19 within central website 18 is executed by processor 25 (potentially in conjunction with memory 27) to offer Quizlets to end user(s) 12 based on any number of parameters (as explained in detail below). The software can also make personality determinations based on harvested data, which could be stored in any type of memory or database. Such a determination could also be developed externally and then uploaded to web server 19 (i.e. central website 18). In addition, this software can include an algorithm that factors in not only personality determinations, but that also incorporates profile information along with end user preferences to make (and/or) to serve up intelligent matching decisions for an online community. An administrator of some kind may further accord weights to each of these components in order to connect individuals who would most likely achieve a successful relationship. This could pertain to job searching functions, online dating, or any other type of person-matching or person-finding operations. In a similar fashion, the software can comprehend word choice decisions by the end users in the online community and make further recommendations (or aid in identifying personality types) based on the specific usage of words and/or their frequency of usage. Furthermore, the software can infer various levels of chemicals (e.g., testosterone, estrogen, serotonin, etc.) of the end user based on responses to questions.

In operation of an example flow, consider a case where a given end user is interested in participating in an online dating scenario. End user 12 can access the Internet, travel to central website 18, register, and create a profile on the site. Note that end user 12 may access supplemental website 20 directly as well. Moreover, end user 12 can access either website through any suitable banner, pop-up, partnership, e-mail solicitations, direct mailings, etc. It can be appreciated that online commerce can be generated by a plethora of marketing tools and any such tools can readily cooperate with the operations of the present invention.

From this point, matching (of any form) can commence amongst the members of the online community. For example, in the context of a romantic endeavor, a person may begin the dating process or engage in communications that would spawn such dating. Other applications could include job applicants who are being sought by employers. Any of the individuals who reside in the online community can begin using any of the tools or capabilities of the platform.

FIGS. 2A-B are simplified screen shots of an example profile to be used in the online dating platform. It is imperative to note that these illustrations (and subsequently FIGURES) are only being provided to further outline a particular implementation of the present invention. In no way should these diagrams be used to limit or to restrict the broad teachings of the present invention. Such illustrative information has been offered earnestly and, thus, should not be construed to confine the broad applications of the present invention.

The profile includes information that was solicited from this end user ("Todd") when he set up his online dating account. The profile includes general information (e.g., address, height, weight, etc.), as well as a segment that reflects some of Todd's personal feelings or his outlook on the world. This information in these two FIGURES is only a profile summary, whereby a full profile can be stored within system 10 at a different location.

Note the level of interest rating component to FIG. 2A. An interest level slider bar is used by the end user in order to make selections or designations about potential dating candidates. The slider bar is easy to use and can solicit the end user's thoughts about a prospective mate. (Note that such a slider bar is simply a graphical illustration that simplifies the end user's experience. Other graphical illustrations may include (but not be limited to), a knob, a bar-graph representation, or any other chart, symbol, picture, illustration, or object capable of displaying an end user's interest level.) The level of interest bar is conducive to an expedient disposal of individuals that offer minimal intrigue to the end user. In a similar fashion, the level of interest bar can readily be utilized in order to initiate the next step in the dating process.

If the slider is moved to the right (indicating a strong preference for this particular individual), then the person can be moved to an "Active Matches" tab (i.e. a queue), where the relationship progresses to the next level. If the slider is moved to the left (indicating a low level of interest in this individual), then this person can be placed into an "Archive" where the relationship does not continue. Note that an inference can be made based on the level of the slider bar such that a potential candidate can be immediately directed to an end user's active matches. In other embodiments, there is no default to "Active Matches" and the end user must manually make this decision: no matter his level of interest rating. For example, a simple prompt may be provided to the end user such that, for a proffered candidate, the end user makes an election (e.g., by clicking his mouse to make a selection) for "Active Matches" or "Archive."

The slider bar represents an easy way for an end user to engage in the candidate selection process. Engagement could yield a progression toward a future relationship or it could remove individuals from consideration from an end user's queue. Both of these actions are productive, as both are results-oriented. Deciding not to engage a certain individual is certainly useful, as choices associated with an end user's dislikes are valuable for identifying and proffering new candidates. This feedback information is imperative to achieving a high level of success in an online dating environment.

It should be noted that the present invention does utilize some technology previously applied for by Applicant. Note that the following related case is hereby incorporated by reference: System and Method for Providing Enhanced Questions for Matching in a Network Environment; Ser. No. 11/237,491, filed Sep. 27, 2005.

Figure 3A:
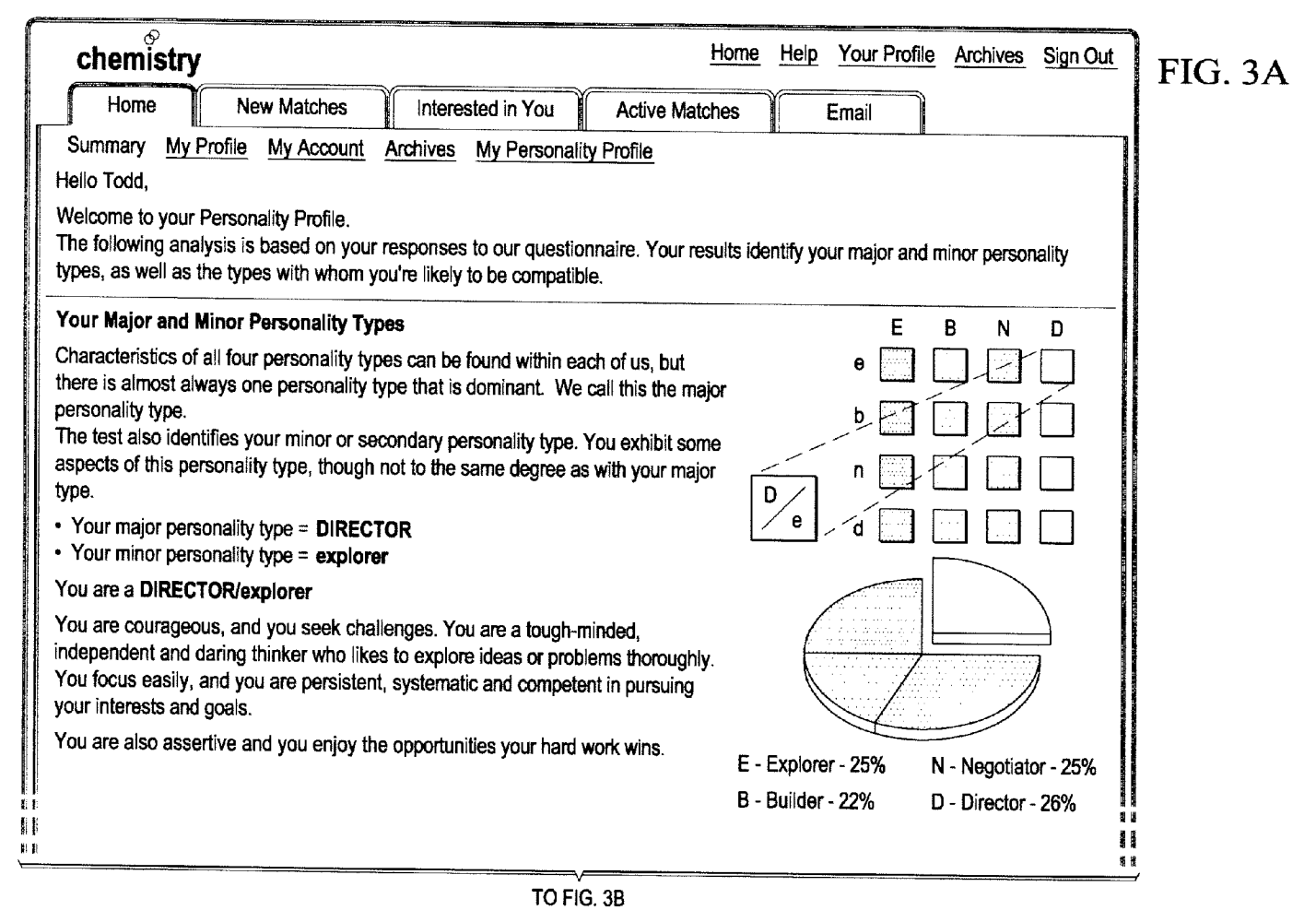

FIGS. 3A-C are simplified screen shots involving an example personality profile to be used in the online dating platform. The personality profile reflects a series of fun, probing questions that get to the heart of who the end user is, and what the end user seeks or needs. The personality profile explores the complex mix of values, traits, and attitudes that are included in the unique identities and relationship needs for a given group of end users. At the conclusion of the personality profile process, the end user can receive a detailed analysis of their personality profile and a guide to the personality types with whom the end user is most compatible.

In the context of the particular example of FIGS. 3A-C, a given end user's personality profile is illustrated. Hence, this end user (Todd) has completed a questionnaire that revealed his personality type (e.g., Director, Explorer, Builder, Negotiator, etc.). The answers to these questions can create a profile or "love map." For example, Todd is designated as having a major personality type of Director and a minor personality type of Explorer. The responses from Todd are used to match him to potential mates based on the compatibility or congruency in their traits, as reflected by the results of the test.

Consider the case where congruency is not necessarily optimal in the context of a dating scenario. Todd may be extroverted and excessively social, but if his mate shared this character trait, this situation may be unworkable. Character traits may have complimentary effects, whereby strict commonality would not always produce an ideal relationship connection. In other embodiments, the personality profile of FIGS. 3A-C is displayed to the end user concurrently with the personality profile of a potential candidate. Using such a comparison/contrast format, the end user could readily see how his interests and character traits are aligned or dissimilar.

Characteristics of all four personality types can be found within each person, but there is usually one personality type that is dominant. This is called the major personality type. The test can also identify minor or secondary personality types. An end user may exhibit some aspects of this personality type, though not to the same degree as with the major personality type. In the context of Todd's personality profile, a pie chart is illustrated to signify his personality makeup. The analysis is based on his responses to a questionnaire provided by system 10. The results here identify Todd's major and minor personality types, as well as the personality types that are most likely to be compatible with his personality. This represents a flavor of the 'relationship rules' as outlined herein. Other formatting of these relationship rules may be more concise: indicating Directors should be matched with Builders, etc. (as further outlined below).

In this instance, Todd's major personality type=Director and his minor personality type=Explorer. Hence, Todd is a DIRECTOR/explorer, which (in the narrative) indicates: "You are courageous; and you seek challenges. You are a tough-minded, independent, and daring thinker who likes to explore ideas or problems thoroughly. You focus easily. In addition, you are persistent, systematic, and competent in pursuing your interests and goals. You also assertive; and you enjoy the opportunities your hard work wins. You have a lot of energy. You think quickly, make decisions more easily than most, dislike unnecessary rules, and take a rational approach to people, issues, and ideas. You do not often enjoy "small talk." You are generally not interested in pleasing boring people and you gravitate to men and women who are intellectually exciting and get to their point quickly during conversations. You are not conventional in most of your attitudes and values. You tend to be irreverent and pragmatic and you like spontaneous people. You can be an exciting, yet hard driving and exacting, friend and companion."

In addition, in this example Todd is E-Explorer—25%, N-Negotiator—25%, B-Builder—22%, and D-Director—26%. [The percentages do not necessarily sum to 100%.] The Explorer element of his personality is known for high energy and high creativity. Explorers seek novelty, risk, and pleasure. In addition, Explorers are intellectually curious and not easily swayed by opinion. Todd is also 22% Builder. These Builder individuals are usually popular and have a deep attachment to home and family. Builders exhibit a calm demeanor and low anxiety, and are often focused on achieving financial security. Todd is also 25% Negotiator. A Negotiator excels at seeing the big picture, long-term planning, and consensus building. Negotiators are quick witted and intuitive. These individuals are also imaginative and nurturing. Finally, Todd is 26% Director. These individuals are skilled at abstract thinking and short-term planning. Directors are often assertive, competitive, and interested in rank and status. Directors are known for easily making people laugh.

Note that any segment of the test of FIGS. 3A-C can include a Myers Briggs portion for the end user to complete. A Myers Briggs test would reveal some personality traits, which may be beneficial to matching two compatible individuals. Other personality tests could similarly be used in this area of the platform and, thus, are within the broad scope of the present invention.

FIG. 3D is a 'Relative Length of Index vs. Ring Finger' depiction, categorized by personality type. The subsequent illustration, FIG. 3E, shows the percent with 'Longer Ring Finger by Personality Type.' Data such as this can aid an administrator of central website 18 in accurately identifying a personality type. After gathering this preliminary data about a person's hand (or other anatomical features), fundamental knowledge about which personality types match best together can be employed to serve up better matches for a given group of end users. FIGS. 3F-3G simply illustrate statistical results of many of these attributes: specifically a means and a percent statistical distribution for these elements, respectively.

Turning back now to the platform and some of its capabilities, FIG. 4 is a simplified screen shot of an example home page for an end user of the online dating platform. "New Matches" may be based on a compatibility personality profile, which identifies long-term relationship potential through variables such as similar or shared interests, values, background, and goals. Note that the end user's feedback, throughout many of the operations outlined herein, is an integral part of the matching process. The level of interest in potential matches allows system 10 to better understand the end user and what the end user is looking for in a long-term relationship. As system 10 accumulates knowledge about the end user's preferences, system 10 leverages intelligence that can refine matching criteria to bring better, more compatible matches to the end user.

As a general proposition, system 10 is designed to learn from end user feedback (e.g., what the end user likes, who the end user likes, what the end user does not like, etc.). Input is integrated into system 10 so that over time system 10 gets a more complete picture of whom exactly the end user is and whom the end user appears to be seeking. System 10 continually learns about the end user. From the first moment the end user makes a dating decision, system 10 begins to gather and compile important data about end user preferences. Throughout the operations of the site, system 10 queries the end user for feedback (e.g., Are you interested in this match? If so, how much? Do you like the way your match answered this question? If not, what is your preferred answer?). Input is immediately processed and used to reevaluate parameters in hopes of offering more compatible matches for the end user to consider.

FIGS. 5A-B are simplified screen shots of an example "Interested In You" profile to be used in the online dating platform. In particular, FIG. 5A shows that Kristen has indicated a high level of interest in Todd such that she is now in his "Interested in You" queue. FIG. 5B shows Kristen's complete profile, inclusive of her basic information (address, height, weight, etc.), as well as more personal detailed information about her.

FIG. 5C is an example schematic that shows how the "Interested In You" component can operate in one implementation. In one embodiment, there are only five matches that are shown to a given end user per day. This could be provided in an Active Matches queue or in any other type of storage element. Other embodiments include more or less than five matches. Note that there is some intelligent coordination that can take place in such an environment. The following example illustrates such a capability or feature.

In this example, the #2 slot on Todd's list reflects a potential mate named Brooke. However, on Brooke's list of potential matches, Todd is only listed in the #8 slot. Because of his position (and assuming that only five matches will be seen by a given end user), Todd may be seen by Brooke tomorrow, or the day after that, or (in theory) never. Todd's displacement is dependent on new matches that are populated into Brooke's queue.

However, Todd can signal that he is interested in Brooke right now because she is currently occupying his second slot in the list. One positive effect of Todd signaling that he is interested in Brooke is that Brooke will generally rate Todd higher than if she would have simply seen Todd in her Active Matches. This heightened level of attractiveness is fully supported by statistical research and empirical data.

Note that this condition can be exploited in order to achieve greater dating success for the operator of the dating platform. For example, if Brooke is generally rated a "7" but only dates persons who hold a level of "7" or higher, Brooke's queue can be populated with persons having a "6" rating or higher (through manipulation of the "Interested in You" component of system 10). These people will consistently respond to Brooke's picture/profile by indicating that they are interested in her and, subsequently, she will uniformly rate these 6s much higher (e.g., as 7s or greater). Hence, one way to achieve the desired effect is to populate Todd's New Matches with Brooke: this strategy fully expects Todd to indicate that he is interested in Brooke. Once Brooke receives the signal that Todd is interested in her (i.e. Todd shows up in her "Interested in You" queue), then Brooke will rate Todd higher than his "deserved" 6 designation. Once Brooke inputs a level of interest rating sufficiently high, Todd will be placed in an "active state" (e.g., in active matches for Brooke) such that the relationship progresses to a next level. The flow in such a scenario is Interested in You ($1^{st}$ direction), then Interested in You ($2^{nd}$ direction), then relationship essentials, then short answers, then e-mail, and then a meeting. These stages can readily be modified or changed based on particular needs.

Figure 6A:
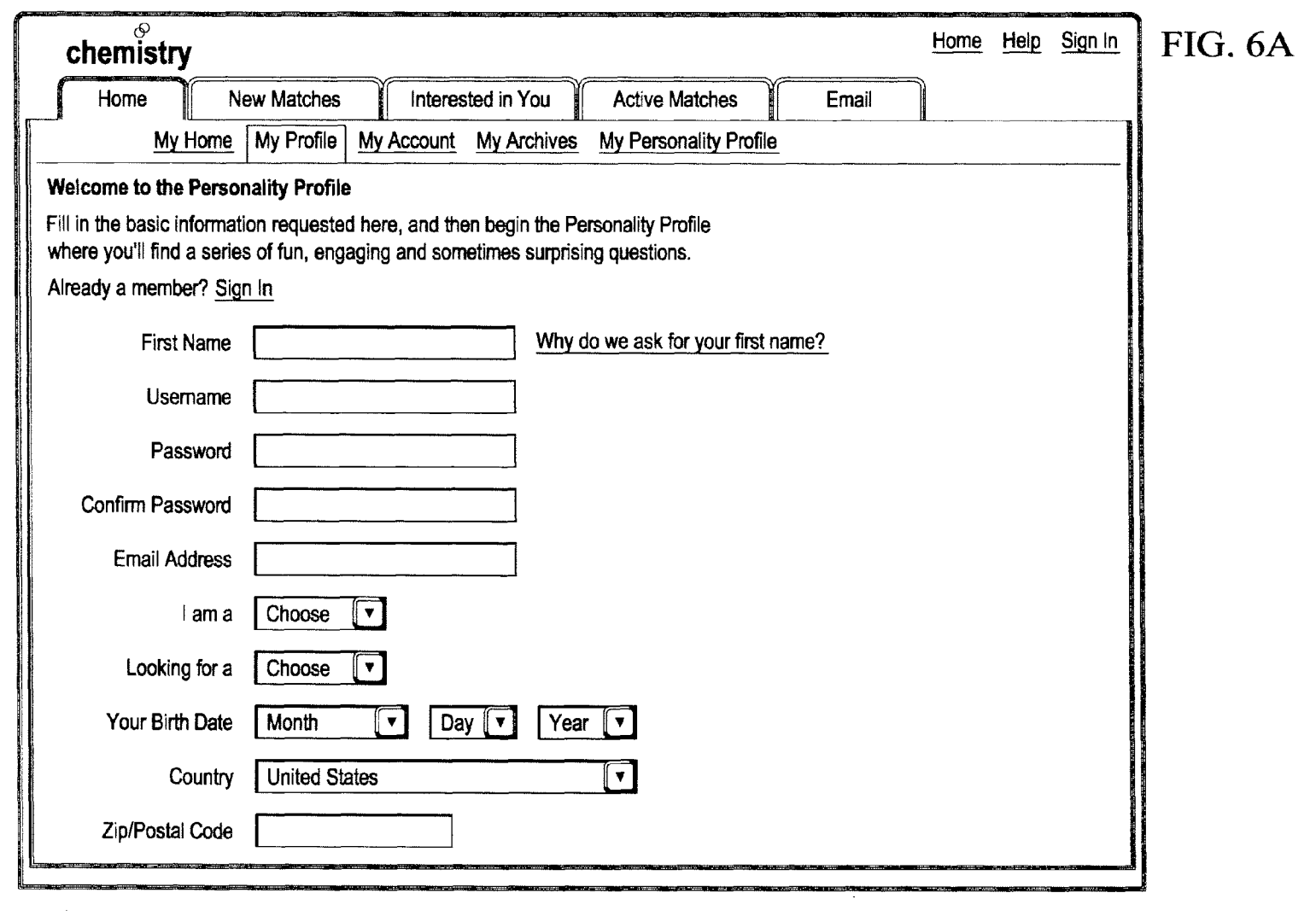
Figure 6D:
FIGS. 6A-Q are simplified screen shots of example phases to be used in the online dating service.
Figure 6E:
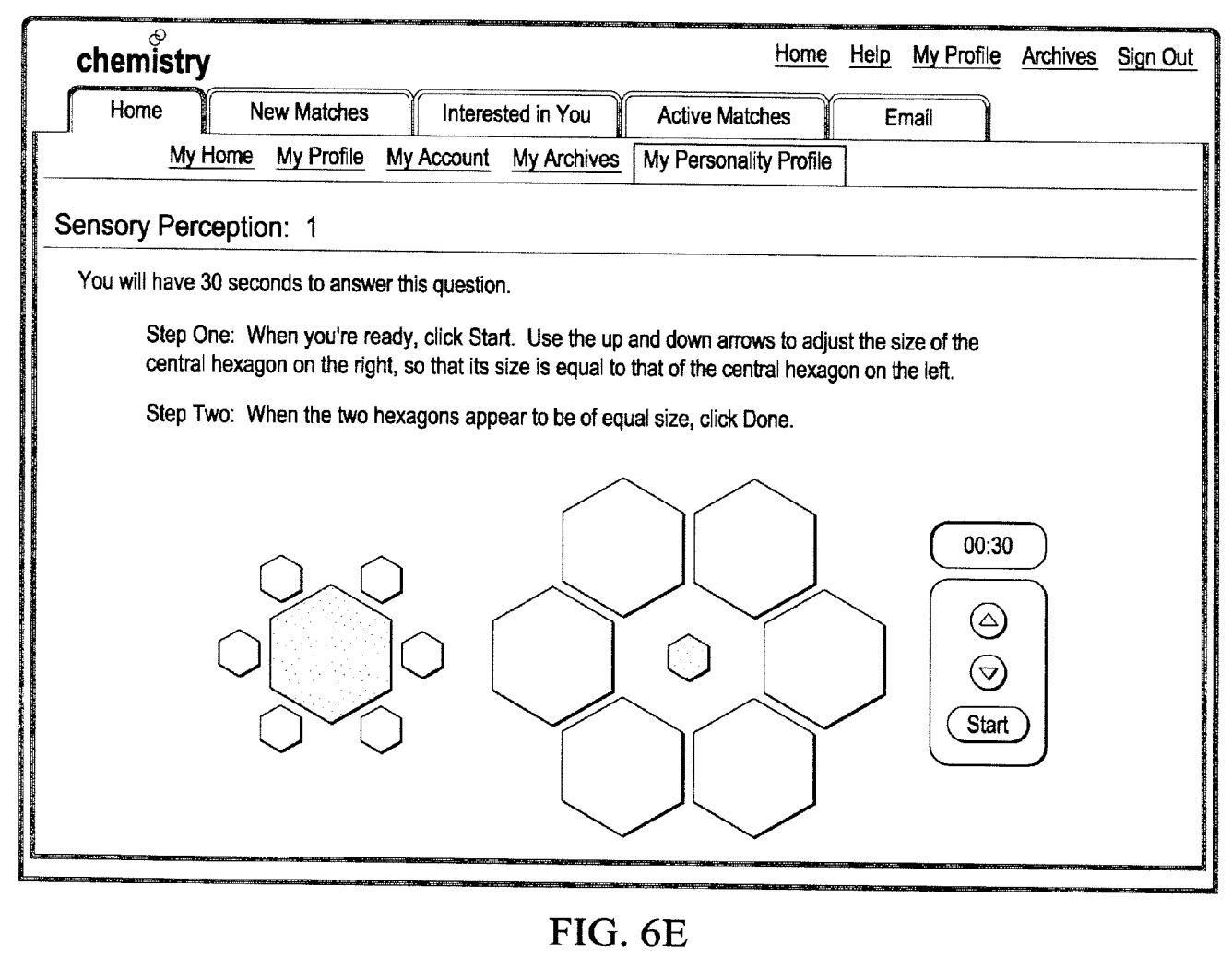

FIGS. 6A-Q are simplified screen shots of example phases to be used in an online dating service. FIG. 6A depicts an example personality profile set-up, while FIG. 6B illustrates a core questionnaire component of the platform in which end users are asked questions about their fundamental ideologies. Universal traits are queried in the segment illustrated by FIG. 6C. FIG. 6D illustrates a non-verbal communication screen shot in which a person is asked to give their interpretation of a particular scene. This information can be used in processing and generating an accurate profile for a given individual, or be used as part of a Quizlet as described below. FIG. 6E relates to sensory perception, as the end user is asked to complete a quick test under a time constraint. FIG. 6F relates to a biophysical profile for the end user, who is asked to describe their own hand. This has some overlap with the previous FIGURES depicting the hand configuration and its significance. Note that other anatomical features (such as jaw line, feet, torso, waistline, etc.) could also be used as a guide in discerning personality types, levels of chemicals (testosterone, estrogen, serotonin, etc.) in the body.

FIG. 6G simply queries the end user for his preferences for ethnicity, religion, etc. It should also be noted that an accompanying slider bar is provided to gauge the importance of each of these qualities. FIG. 6H illustrates a dual-slider bar in which two elements are considered together. A profile headline and essay are requested in FIG. 6I, which solicits additional thoughts from the end user.

Figure 6J:
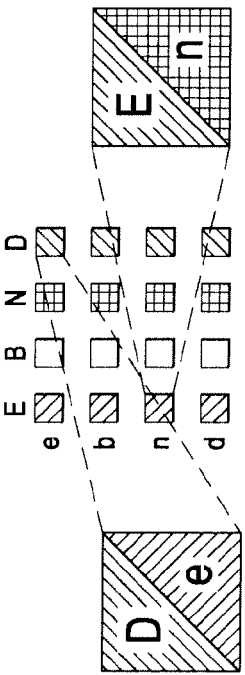
Figure 6M:
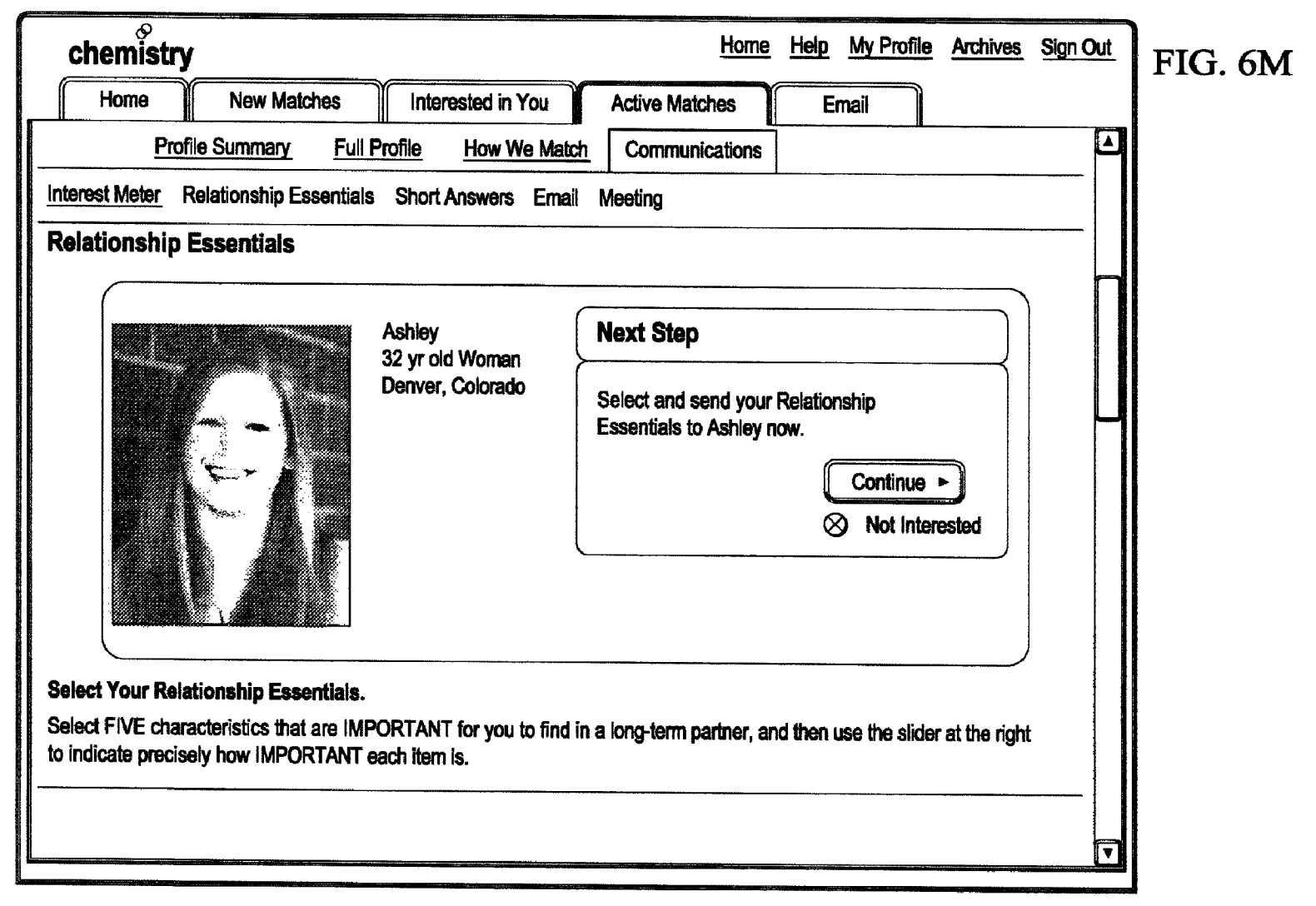

FIGS. 6J-K illustrate how two people are matched using all of the information provided previously. This intelligent matching is a result of numerous algorithms and (potentially) judgment calls or configurations made by managers of the platform. The weight of this information may be based on anthropological considerations, scientific studies, levels of testosterone/estrogen, and/or any other designations (which may be simply a choice made by one or more operators of the website). Considerable flexibility is provided by the platform of the present invention, as virtually any parameter may be evaluated, considered, and accorded a selected weight for purposes of enhancing the dating experience for the individual.

Figure 6N:
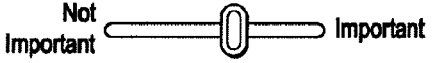
Figure 6O:
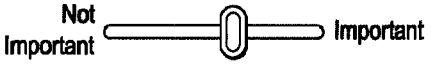
Figure 6P:
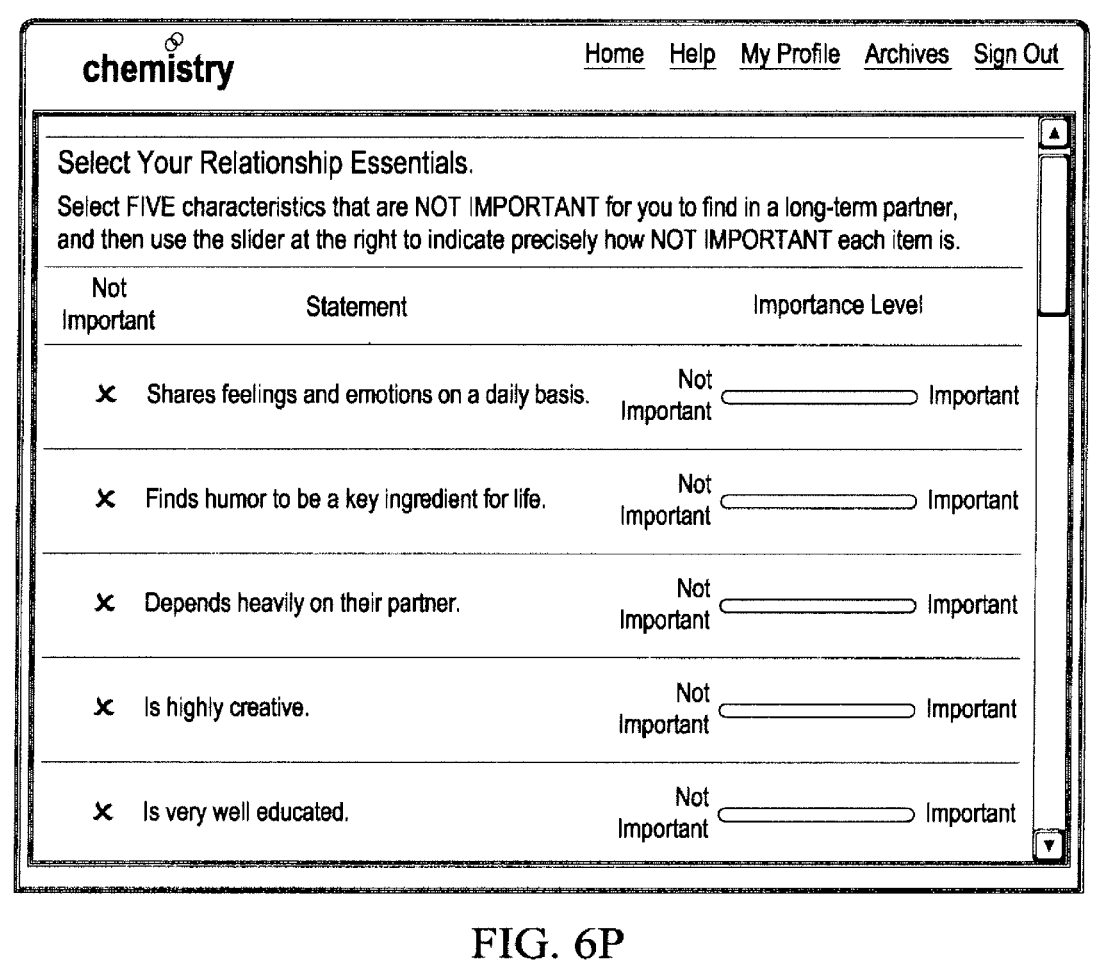
Figure 6Q:
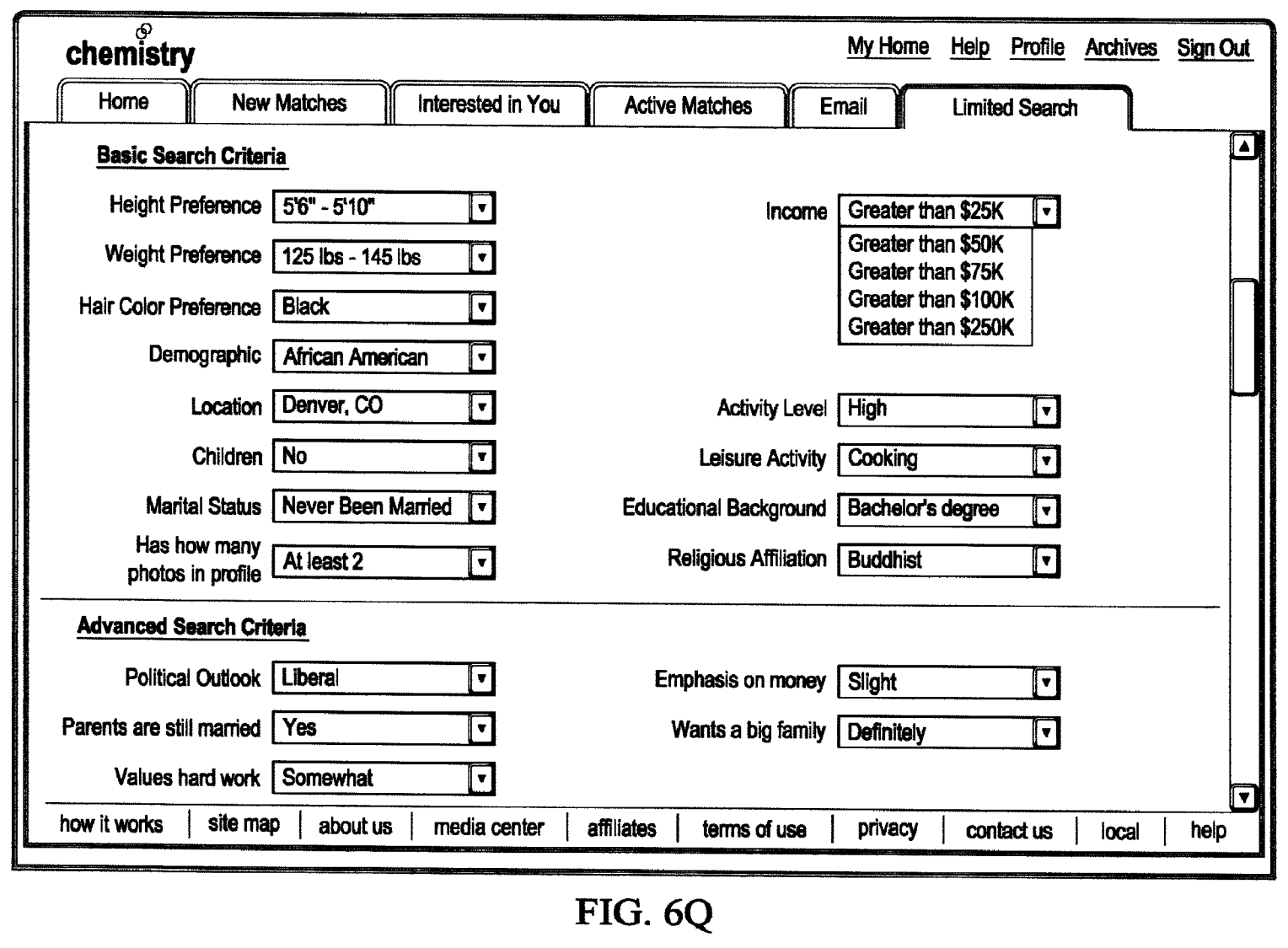

FIG. 6L illustrates this particular end user's personality traits as compared to his counterpart (Liz). Note that in this case (as illustrated by the graphical illustration), there is good congruency in character traits between these two individuals. FIG. 6M illustrates how the end user is prompted to send their relationship essentials to a potential match. FIGS. 6N-O illustrate an end user selecting seven (7) relationship essentials to be sent to their dating counterpart. FIG. 6P illustrates an example relationship essentials layout. A number of slider bars are provided to make end user selections in this regard.

As evidenced by the preceding FIGURES and by the accompanying descriptions, these phases focus on the true interests and preferences of members of the online dating community. The information gathered is solicited in different ways and is highly interactive. Moreover, such tests are fun and easy to complete, as the end user can quickly navigate through these preliminary steps. However, their simplicity should not hide their significance; these tests provide critical information that is to be used in addressing compatibility issues and, furthermore, enhancing the chances of long-term relationship success.

FIG. 6Q illustrates a simplified screen shot of an example limited search criteria template to be used in the online dating service. In one embodiment, the search component includes a first section (e.g., basic search criteria) and a second section (e.g., an advanced search criteria). Basic search criteria include rudimentary parameters such as demographics, height, weight, etc. Advanced search criteria are more involved, as they pertain to more conceptual queries (e.g., a desire to have a big family, thoughts about money, political outlook, etc.).

In operation of an example flow, consider a case where there are five new matches in the Active Matches tab and an end user indicates that he has interest in only one of the five (the other four being sent to the archive). The end user can be afforded the opportunity to perform one limited search (e.g., one per day) in order to identify other participants who meet specific criteria in which he is interested. For example, the end user may have detailed criteria concerning the age, physical activity level, and education of a potential mate. Criteria can include any of the profile information identified herein. The search criteria can also include any of the items illustrated in FIG. 6Q (or any of the items provided in the other FIGURES included with this patent application). Other parameters of interest to a given end user could readily be used for search purposes and, thus, are included within the broad scope of the present invention. The present invention is replete with any such alternatives and, accordingly, should be construed as such.

The platform allows the end user to search the system using any selected parameters and, further, the platform can re-populate the Active Matches list with these newly discovered individuals. The limited search can be run on central web site 18 or on supplemental web site 20 or be executed on other devices (e.g., end user devices).

Figure 7B:
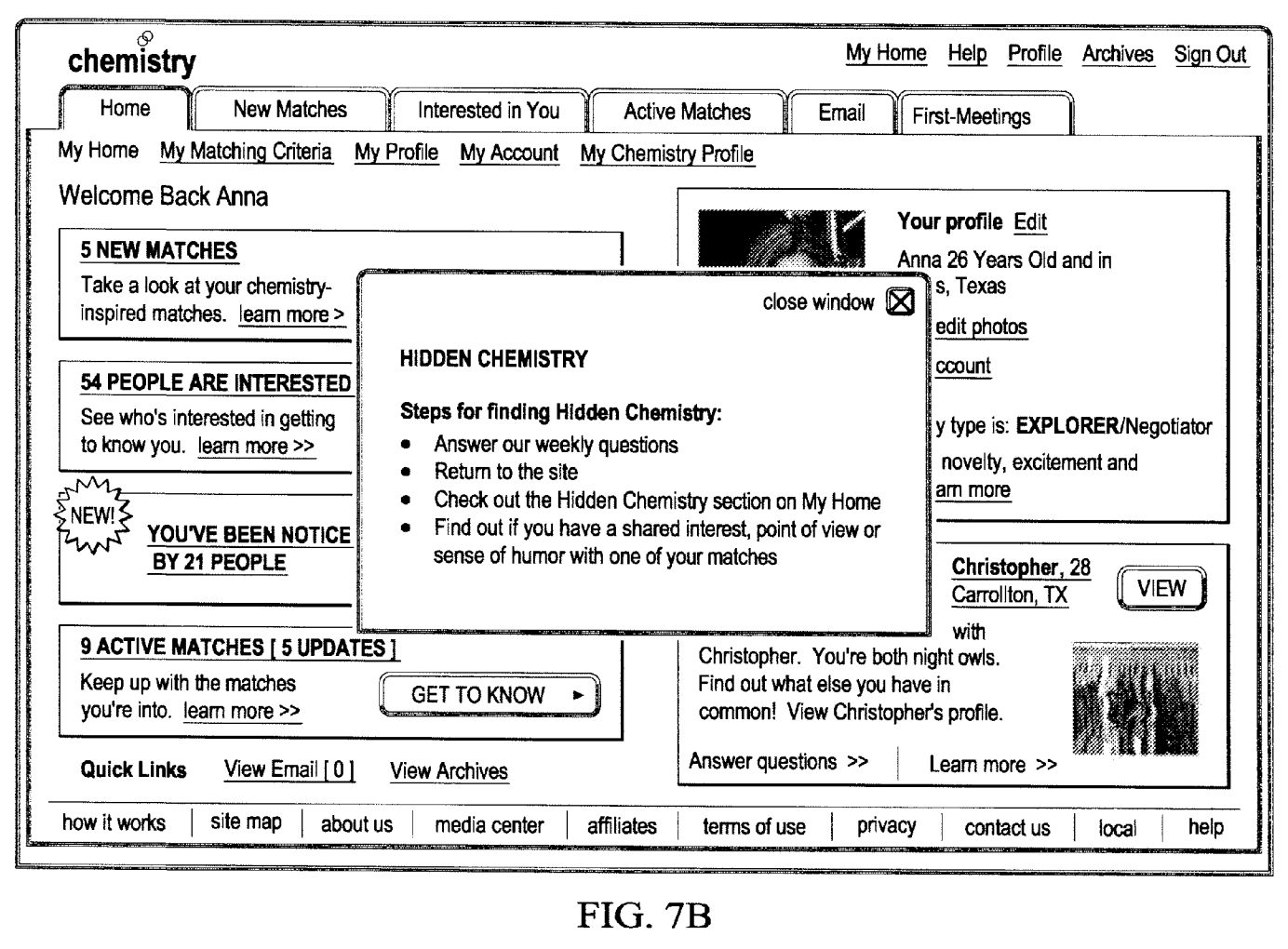
Figure 7C:
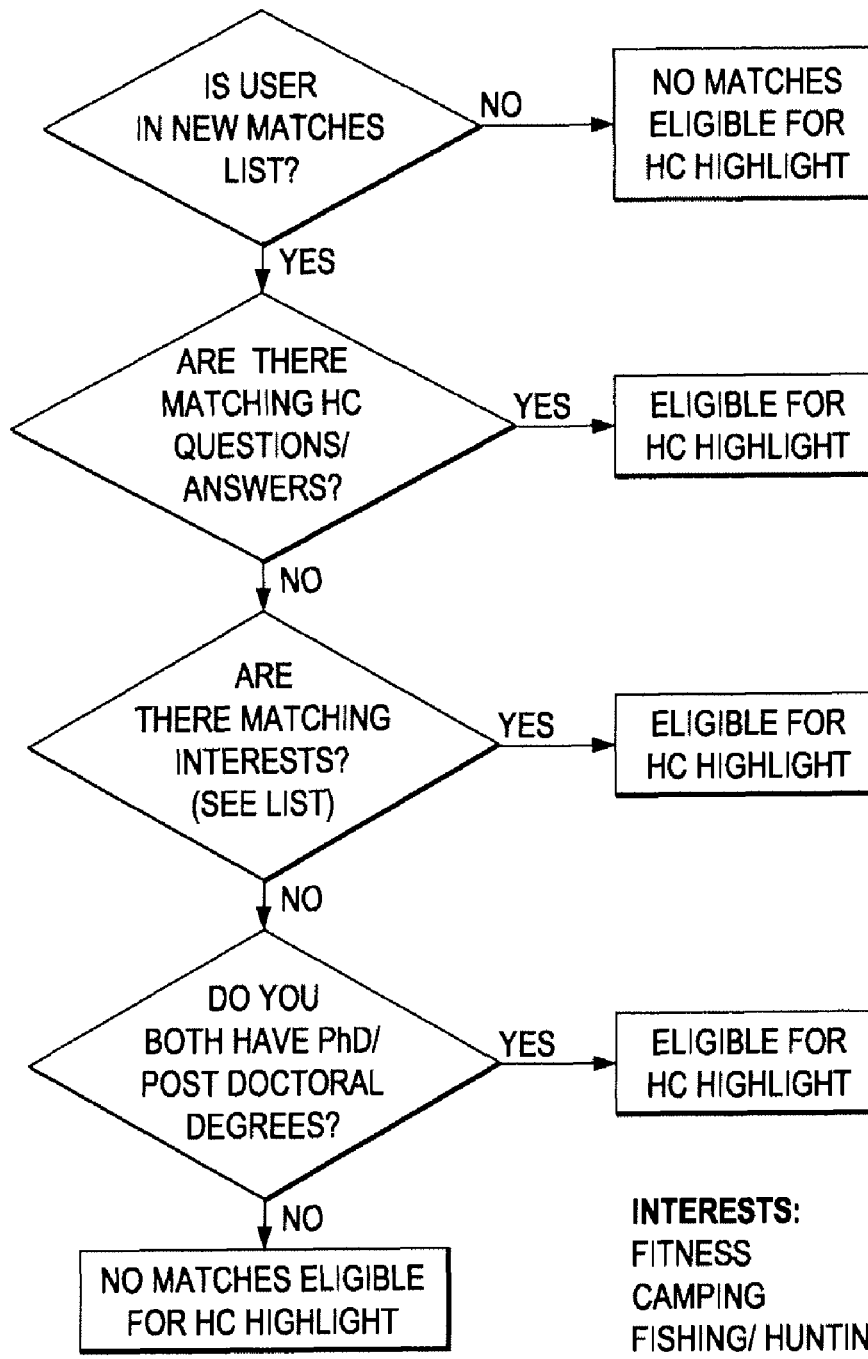
Figure 7D:

FIGS. 7A-7H offer example screen shots of the way in which a Hidden Chemistry feature of the system may operate. FIG. 7A offers an example home page in which a user would systematically see their new matches, end users that have noticed this particular end user, other end users that are interested in this end user, active matches, and a Hidden Chemistry component. Some of these features are embodied in tabs, as depicted in FIG. 7A. FIG. 7B depicts a floating screen that offers the steps for finding Hidden Chemistry between end users. In this non-limiting example, these steps include answering weekly questions, returning to the site, checking out the Hidden Chemistry section on the home page, and finding out if an end user has a shared interest, shared point of view, or a shared sense of humor with one of the this end user's potential matches.

Figure 7E:
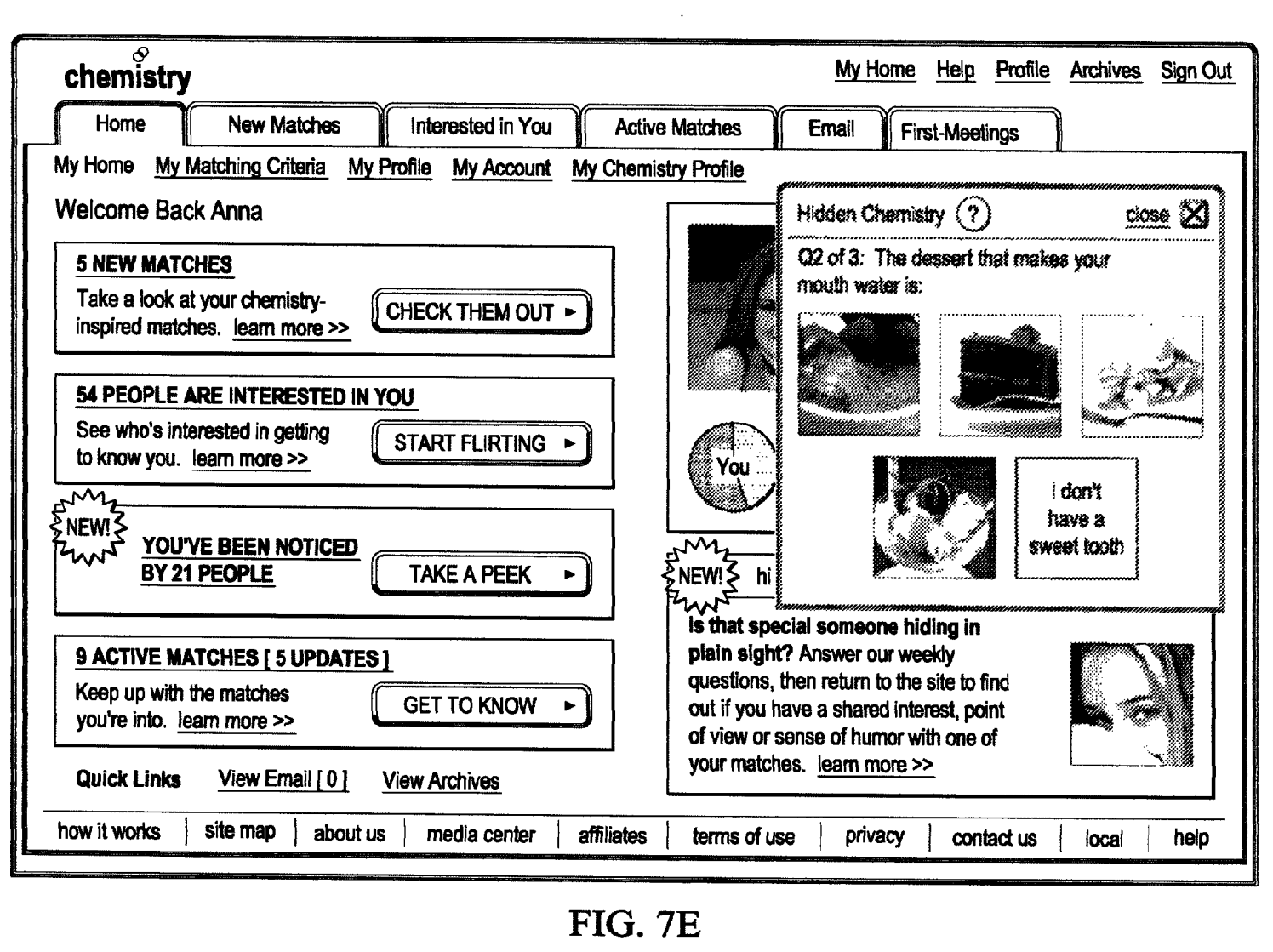
Figure 7F:
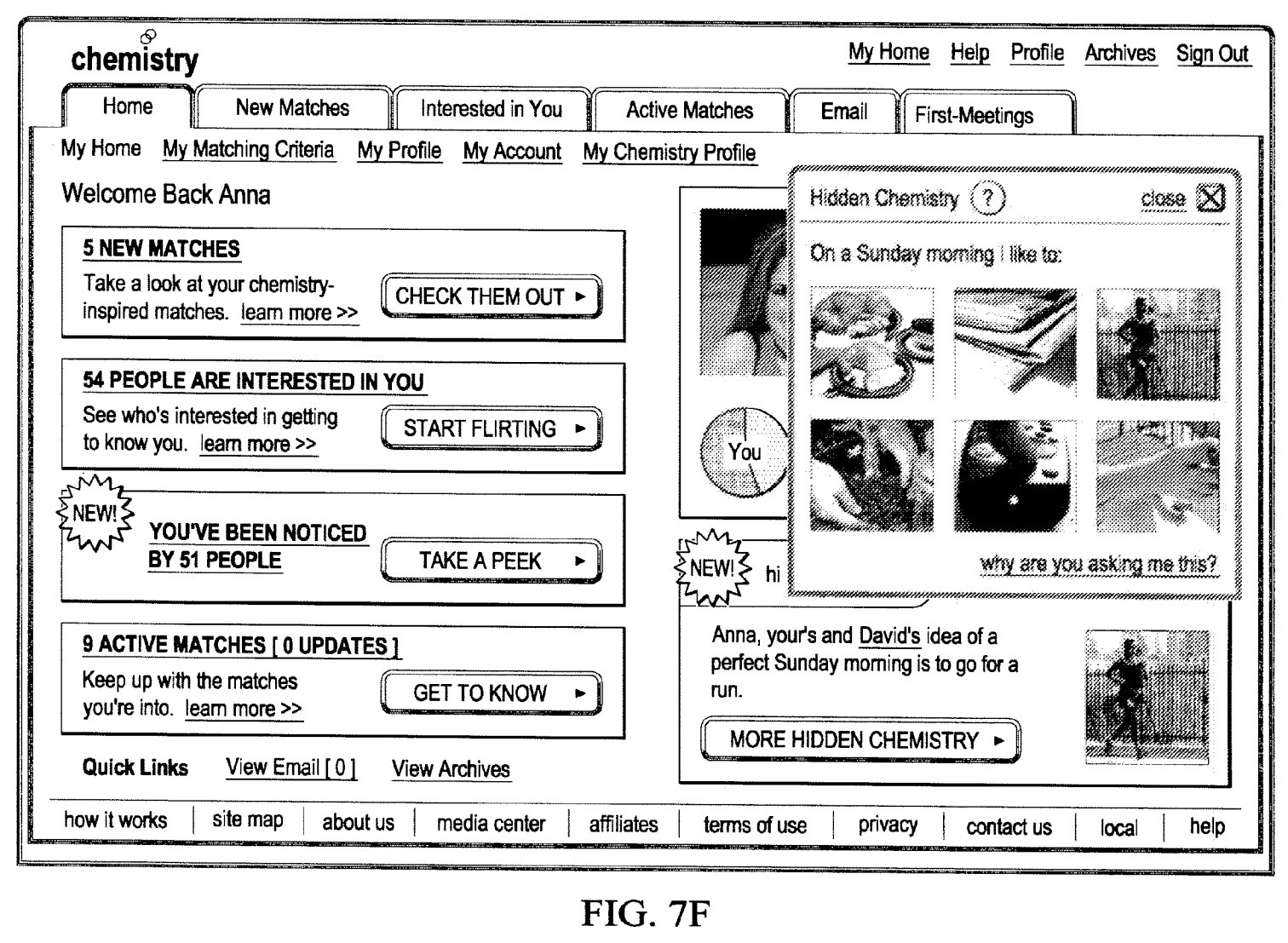
Figure 7G:
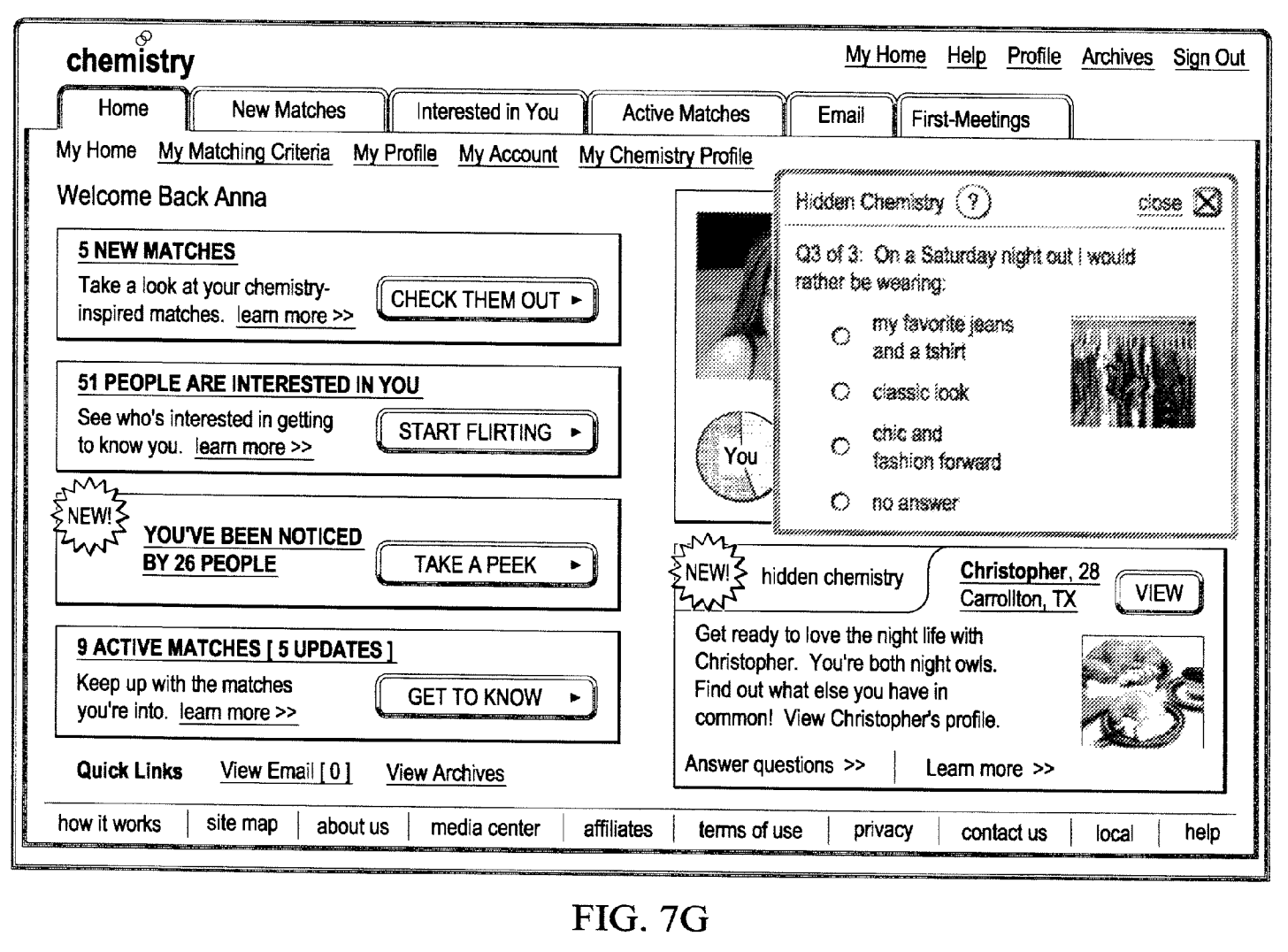

Collectively, these queries can form a type of Quizlet that provides yet another valuable tool for matching two (or more) persons with related interests. Such a Quizlet can also increase end user viewing and, further, stimulate users to take action on profiles (e.g., on new matches that are populated into the end user's queue). FIG. 7C offers a simple process overview of the way in which the Quizlets could be pushed to the end users in the online community. In this example logical flow, the first step inquires as to whether a user is in a new matches list. If the answer to this question is 'Yes' then the second inquiry addresses whether there are matching Hidden Chemistry (HC) questions and answers.

If the answer to this question is 'Yes' then the user is eligible to receive a Hidden Chemistry highlight (or message), which would indicate some element of congruency or similarity in the responses being provided by two different end users. If the answer to this question is 'No' then the subsequent query asks if there are matching interests in a corresponding list (which is depicted in FIG. 7C). Again, if the answer is 'Yes' then the end user is eligible for a Hidden Chemistry highlight. If the answer at this juncture is 'No' then a subsequent query asks whether the end user has a PhD or Post-Doctoral degree. Where this question is resolved in the affirmative, then the end user is eligible for a Hidden Chemistry highlight. However, if the answer to this question is 'No', then there are no matches eligible for a Hidden Chemistry highlight.

In more general terms, identifiable attributes can be used (and accorded different weights at the discretion of the administrator) to ideally connect persons having a given persona or personal blueprint. In one example, the profile information along with personality identification and stipulated preferences (from the end user) could be used in conjunction with the Quizlets to better match a given person to another person, or to better match a person to a specific situation. The Quizlets attempt to refine or to modify the matching process based on a brief questionnaire that solicits more information from a given end user.

In one example process flow, specifically in regards to online dating, end users would be given a set of other end users to consider for potential dating. This example set of candidates could be two, three, five, ten, etc. matches for a given end user to consider. Once the end user has reviewed the potential matches in his queue, then he/she is given another specified set of matches (e.g., another five, another ten, etc.).

In some instances, the end user who is being given these five or ten potential matches is not taking the time to review his/her queue. He/she may not be taking action in terms of reviewing these other end user profiles, or initiating communication with these other end users, or even rejecting these profiles. Moreover, no decisive action is even being taken, as their queue is stagnating.

This problem of inactivity is an issue and leads to poor customer satisfaction. In essence, end users need to be encouraged to continue reviewing their new match candidates: regardless of whether they will decline or pursue these new candidates. The system of the present invention (via the website, a web server, a processor, software, etc.) detects end users who satisfy some or all of these criteria (e.g., they are not reviewing their potential matches that are being delivered to them).

Note that the actual profile of a given end user is somewhat static. The use of a Quizlet can solicit current and new information about the end user, while urging the end user to evaluate other candidates in the online community. In one example, the end user is asked some questions that reveal something interesting about the end user. One way in which this could be delivered could be a floating screen module that automatically gets served up each time the end user logs into the system (or simply accesses the platform). This could, for example, be provided on an electronic dashboard or on the home page. Other methods of delivery could include e-mail communications, questionnaires, or any appropriate form of communication (chosen by either the administrator or the end user via preferences). The medium of delivery includes service-oriented architectures and web services where data/questions are served to different devices (e.g., serving up questions via a mobile phone application, via a FaceBook application, RSS feeds, etc.). Such mediums may or may not necessarily involve the central website.

The floating module could be delivered several times per week or per month and the module could go away (be removed) if the user does not wish to fill it out and participate in the Hidden Chemistry feature. He/she could just close ("X") the floating screen as it appears, or he/she could elect not to receive these Quizlets.

The actual questions of the Quizlets could be virtually anything, such as something topical (i.e. based on a current event). Other questions could solicit end user interests, such as: "What's your favorite accent?" or "What's your favorite food?" Other questions could reveal an ideal dating scenario, such as: "Chinese Food and a stroll through Central Park" vs. "Margaritas at sunset followed by a walk on the beach" vs., "Gambling the night away in Las Vegas." Again, any question could be used to further probe a particular end user's interests. Some examples of possible Quizlets are offered in FIGS. 7D-7G.

The length of the Quizlet could be a single question or multiple questions. Similarly, they could involve fill in the blank statements, narratives, pictures and images, or matching exercises. Again, any formatting could be used to provide these Quizlets for the end user. Quizlets can be systematically broadcasted to end users in the online community based on any given criteria (e.g., inactivity by the end users in not reviewing the potential matches being delivered to the end user).

The answers to the Quizlets can then used to highlight compatibility between a given end user and other users. Note that where answers reveal potential connections, the answers do not have to necessarily be similar, but compatible with each other. As used herein in this Specification, the term 'compatible' is meant to encompass responses that could be either similar or dissimilar, or exact. All such permutations are within the scope of the word 'compatible.' In one example, the comparisons are made between the end user and the matches that were already found for this particular end user (i.e., the end users are already part of the "New Matches" queue). In this sense, the end user is being urged to review another end user who already has strong similarities with this end user, or who seems to be a good match for this end user.

Figure 7H:
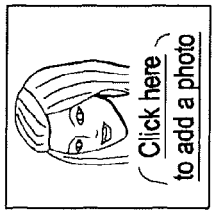

FIG. 7H illustrates an example in which the Hidden Chemistry feature is being used to encourage a user to complete their profile so they can be matched. Until this profile is completed, they cannot be matched by central website 18. In theory, the Hidden Chemistry tool would trigger an end user to complete a profile (e.g., answer questions or filling out the requisite forms). After completing the profile, a daughter window could transition to a home page after a prescribed amount of time (e.g., after five seconds). If the end user clicks on a "Hidden Chemistry" icon, then a "questions to answer" link could appear (e.g., via a pop-up message).

The number of questions available could be configured to any suitable number (e.g., a maximum of six). Questions can be displayed in the order of earliest to most recently unanswered questions to improve the chances of finding question matches. In one example configuration, the platform will start with three questions and subsequently push out three new questions every week. Some type of storage element (e.g., a database, memory 27, etc.) can store a display date, questions, answers (both text and images with ALT tags can be used), etc. If a user has no one that has either responded to the questions or responded in the same way, the platform can highlight an interest such as: Books/Reading, Fitness, Camping, Fishing/Hunting, Museums and Galleries, Playing Sports, Cooking, and Watching Sports. In cases where there are still no matches, a subsequent check can be performed for an education level (e.g., a PhD/Post Doctoral).

In regards to highlighting a profile for being included in the Hidden Chemistry activities, new matches that have not been viewed can be given the highest priority. If all profiles have been viewed, the platform can randomly select one from a given set of connectors. All end users, who completed questions that have been matched, can be made available to other counterparties. Most recent questions could be highlighted first. By clicking on the highlight (e.g., a message, an icon, etc.) offered to the end user, the end user is taken directly into the profile details. If a user takes action on a highlighted profile during the session, a final confirmation screen could follow the current flow. The same profile could be highlighted throughout the session if no action is taken. If the user takes action on the highlighted profile and they have questions to answer, then a "respond to questions" module can appear for the end user. If a user has no profiles to highlight and has no more questions to answer, the end user can be shown a modified Chemistry Tip (e.g., "Improve your chance for finding chemistry by . . . [suggestion for the end user]"). One such set of tips is illustrated by FIG. 6F.

In operation of an example case, consider where a first end user answers a given Quizlet and a second end user (who is already deemed to be a potential match for the first end user) answers her Quizlet such that the two sets of answers are highly similar, which central website 18 deems compatible. Central website 18 could then suggest that the first end user should consider this second end user: not only based on profile and personality information, but also based on this new Quizlet information, which shows compatibility based on similar responses. Again, 'similar' in this context means answers that are compatible with one another. The urging or nudge could be in the form of another floating screen, e-mail communication, etc. The substance of the notification could be something like: "Both you and the second end user agree that 'Gambling the night away in Las Vegas' would be a terrific date." In addition, the notification could include: "Both of you share the same viewpoint on the latest song from a given popular artist."

Again, virtually any piece of information can be solicited from the end users to help move the relationship process along. In another example, an administrator could prohibit an end user from seeing more and more matches until he/she resolves the current matches in their queue, or until the end user completes the Quizlet that is being offered.

Figures 1, 8B:
Figure 8A:
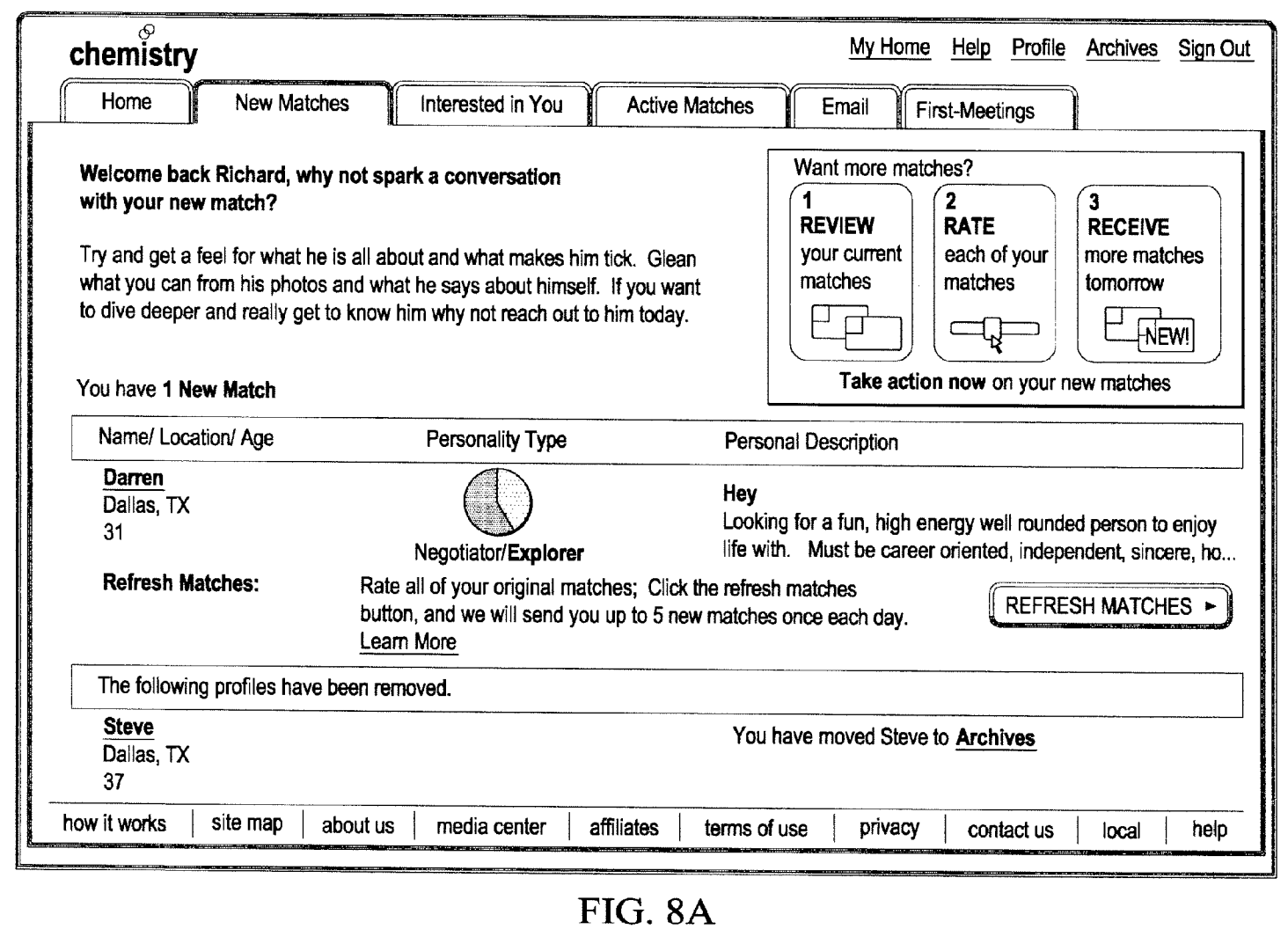

FIGS. 8A-8D are simplified screen shots illustrating various potential tabs of a communication platform in accordance with one example embodiment of the present invention. More specifically, FIG. 8A illustrates a 'New Matches' tab that highlights new end users in the online community: users that may be appealing to this particular end user. Each new match includes a personality type, a personal description, and a name/location/age section. The FIG. 8B series illustrates a home page that identifies users that have viewed a user's profile, but did not take action on this particular end user's profile within a stipulated time period (e.g., 24 hours).

Figure 8D:
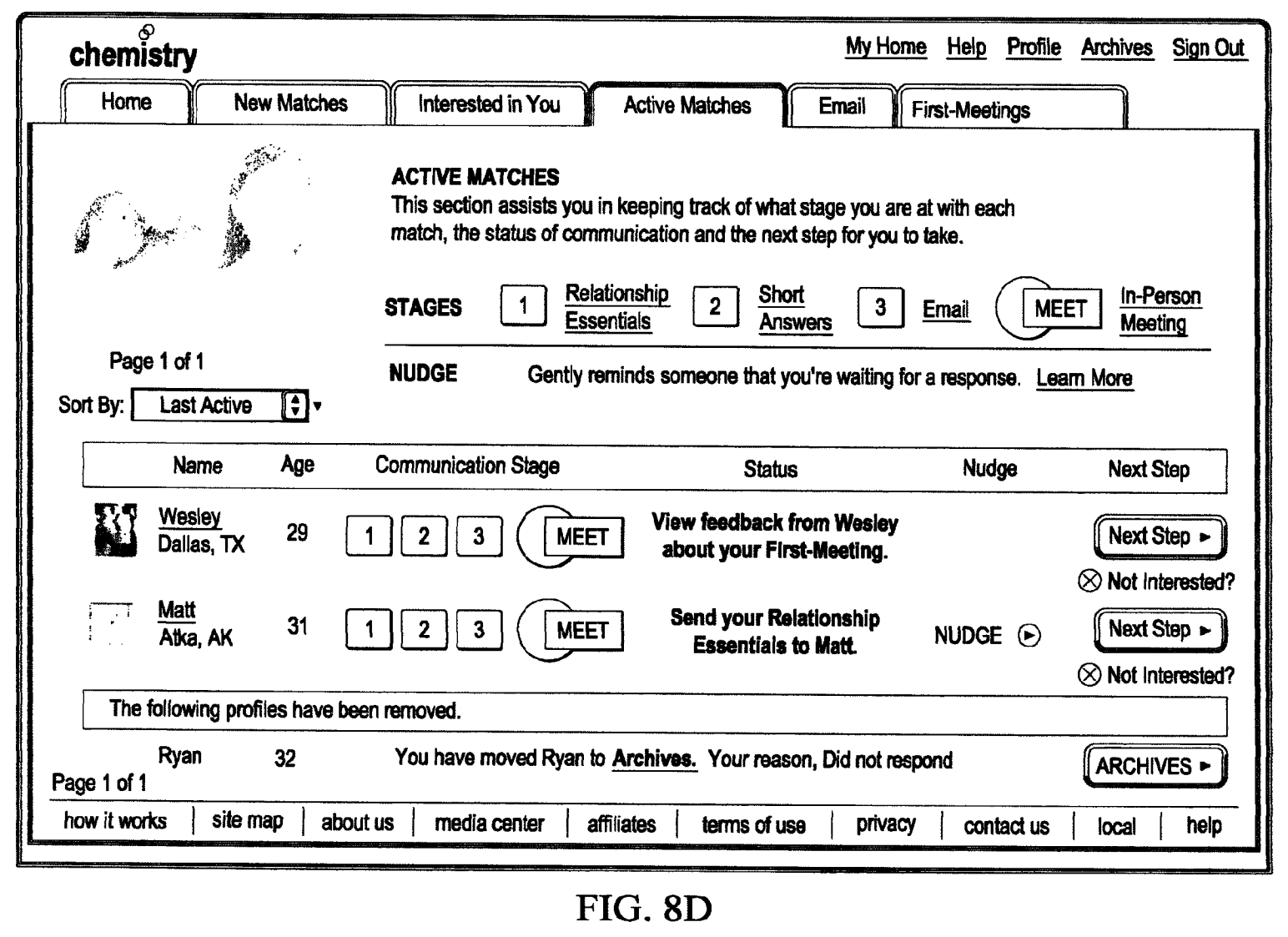

The FIG. 8C series depicts an 'Interested in You' tab in which end users are shown other users who have expressed interest in them, along with their personality type, personal description, and name/location/age. Also provided in these illustrations is a 'Nudge' feature, which allows the end user to send a message to another end user that would encourage more activity. FIG. 8D illustrates an 'Active Matches' tab that illustrates where this particular end user has expressed interest or entered into the guided communication process with certain end users. This is provided along with respective summaries, their ages, and the communication stage for each individual end user. A status column is also provided for each possible match.

Figure 9A:
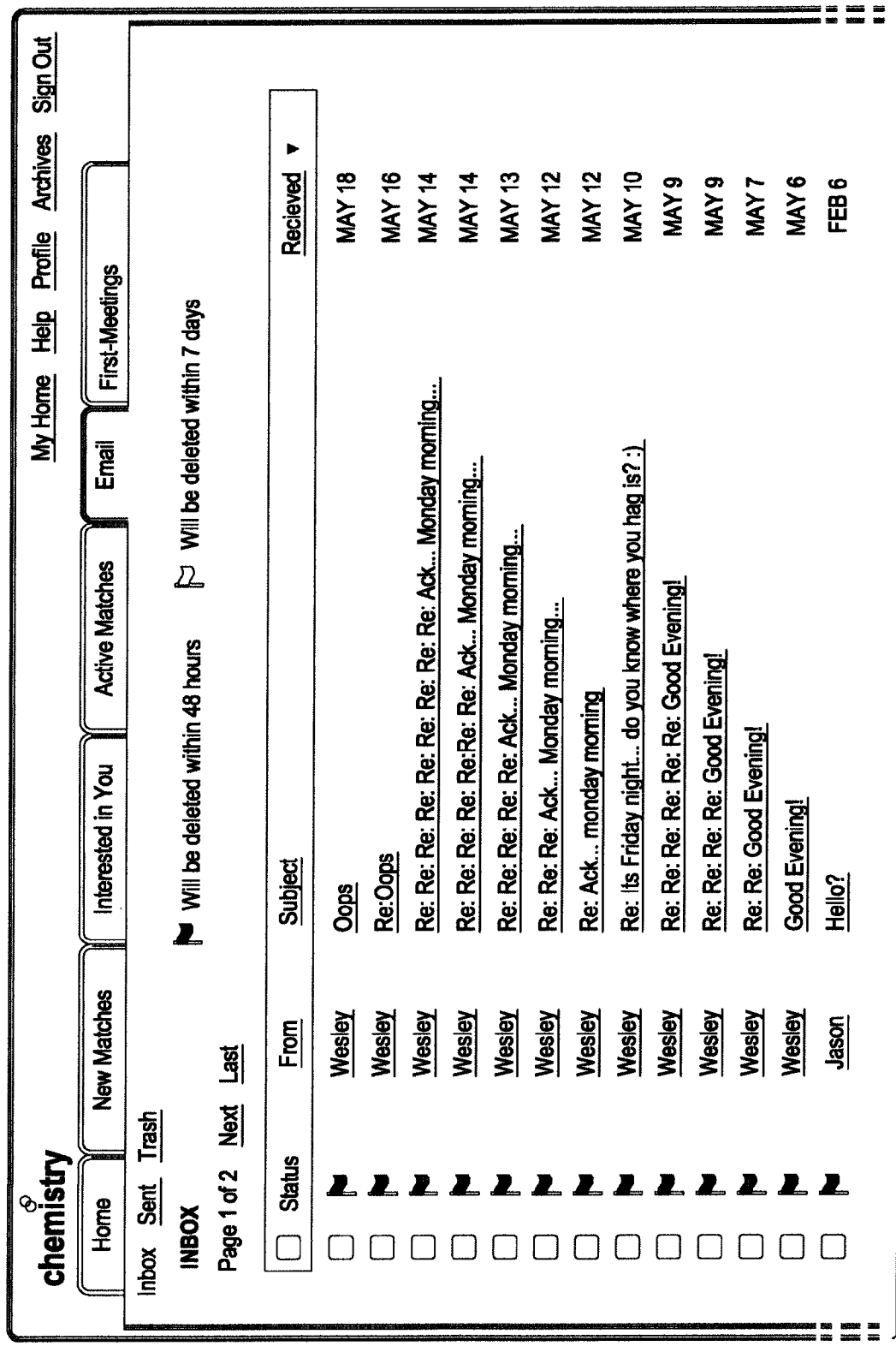
FIGS. 9A-9B illustrates an 'E-mail' tab of the system for end users to use in communicating with one another.
Figure 9B:
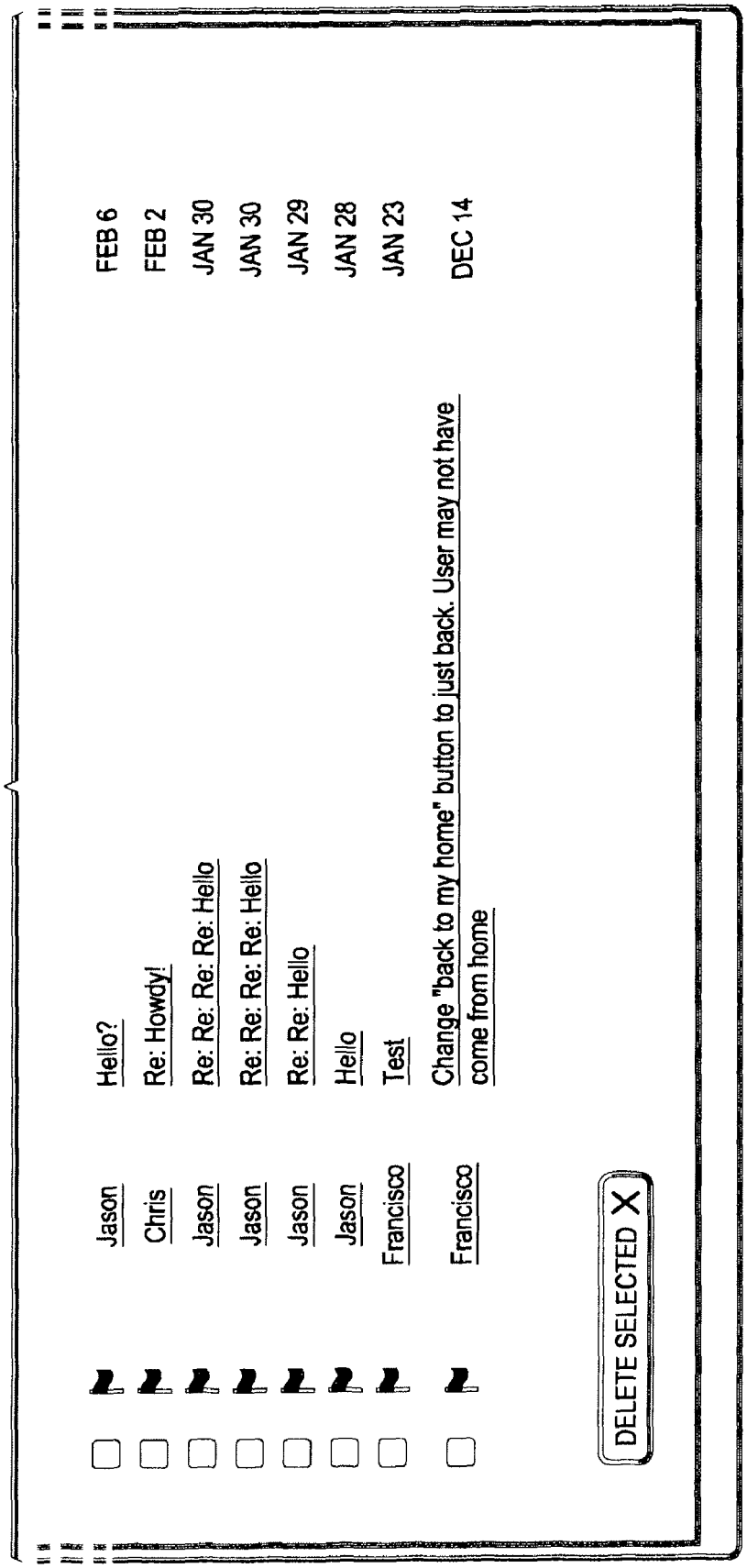

Finally, FIGS. 9A-9B illustrates an 'E-mail' tab for end users to use in communicating with one another. In certain instances, the actual online dating platform can act as the intermediary for all e-mail communications between end users. However, in other scenarios, the end users could certainly contact each other directly (where certain permissions would be granted before allowing such access).

Some of the steps illustrated in the preceding FIGURES may be changed or deleted where appropriate and additional steps may also be added to the process flows. These changes may be based on specific communication architectures or particular interfacing arrangements and configurations of associated elements and do not depart from the scope or the teachings of the present invention. It is important to recognize that the FIGURES illustrate just one of a myriad of potential implementations of system 10.

Although the present invention has been described in detail with reference to particular embodiments, it should be understood that various other changes, substitutions, and alterations may be made hereto without departing from the spirit and scope of the present invention. For example, although the present invention has been described with reference to a dating protocol, any service that deals with connecting people together could readily benefit from the present invention. Hence, the central website of the present invention could readily be associated with a job seeking service, a person finder service, an athletic service, a real estate service, an academic service, a real estate finding service, an escort service, or any other service where matching is of some significance.

Moreover, although the present invention has been described with reference to a number of elements included within system 10, these elements may be rearranged or positioned in any appropriate manner to accommodate any suitable networking configurations. In addition, any of the elements of FIG. 1 may be provided as separate external components to system 10 or to each other where appropriate.

It should also be noted that any of the question portions of the platform can leverage any type of format. Thus, in establishing a personality profile, in generating a pre-date profile, in executing relationship essentials, in answering short answer questions, any suitable question format can be employed. Example formats include a Yes/No format, a multiple choice question format, a short answer format, a true/false format, etc. Other formats can readily be used in order to achieve the desired responses.

Additionally, it should be noted that the personality determination tools (related to word choice, hand measurements along with other anthropological features, responses to questions, levels of chemicals, etc.) can be used in any suitable combination to select appropriate matches. This could involve intentionally ignoring some or all of these in matching two candidates. The administrator can certainly configure any appropriate weighting for these components and choose to exclude any one of these. All such permutations are clearly within the broad scope of the present invention.

Numerous other changes, substitutions, variations, alterations, and modifications may be ascertained to one skilled in the art and it is intended that the present invention encompass all such changes, substitutions, variations, alterations, and modifications as falling within the scope of the appended claims.

What is claimed is:

1. An apparatus, comprising:
    a server that includes a processor, wherein the apparatus is configured to:
    interface with one or more end users to establish a profile for each of the end users to be used in matching the end users to each other, wherein information is provided in the profile and the information includes relevant characteristics of corresponding end users;
    provide one or more questions to the first end user;
    provide the questions to a second end user whose profile has previously been matched to the first end user's profile;
    compare answers for the questions from the first and second end users; and communicate a subsequent message to the first end user if the answers provided by the first end user and the second end user are determined to be compatible, which is indicative of responses that could be either similar or dissimilar, or exact, and wherein the subsequent message highlights a first answer by the first end user that is compatible with a second answer by the second end user and wherein, by clicking on the subsequent message, the first end user is taken into a profile detail of the second end user.

2. The apparatus of claim 1, wherein the questions are presented to the first end user via a floating screen module.

3. The apparatus of claim 2, wherein the floating screen module is delivered to the first end user when the first end user logs into a central website.

4. The apparatus of claim 1, wherein the questions are provided on an electronic dashboard displayed to the first end user.

5. The apparatus of claim 1, wherein the questions are provided in an e-mail communication to the end user.

6. The apparatus of claim 1, wherein the questions relate to an interpretation of a picture or an image that is shown to the end user.

7. The apparatus of claim 1, wherein inactivity by the first end user triggers the questions being asked of the first end user.

8. The apparatus of claim 1, wherein the first end user and second end user were previously matched and shown to the first end user on an electronic dashboard before the questions were asked of the first end user.

9. A method, comprising:
    interfacing with one or more end users to establish a profile for each of the end users to be used in matching the end users to each other, wherein information is provided in the profile and the information includes relevant characteristics of corresponding end users;
    providing a first end user with one or more questions; and
    providing the questions to a second end user whose profile has already been matched to the first end user's profile, whereby answers for the questions from the first and second end users are compared and a subsequent message is sent to the first end user if the answers provided by the first end user and the second end user are determined to be compatible, which is indicative of responses that could be either similar or dissimilar, or exact, and wherein the subsequent message highlights a first answer by the first end user that is compatible with a second answer by the second end user and wherein, by clicking on the subsequent message, the first end user is taken into a profile detail of the second end user.

10. The method of claim 9, wherein the questions are presented to the first end user via a floating screen module.

11. The method of claim 10, wherein the floating screen module is delivered to the first end user when the first end user logs into a central website.

12. The method of claim 9, wherein the questions are provided on an electronic dashboard displayed to the first end user.

13. The method of claim 9, wherein the questions are provided in an e-mail communication to the end user.

14. Logic encoded in non-transitory media for execution and when executed by a processor operable to:
    interface with one or more end users to establish a profile for each of the end users to be used in matching the end users to each other, wherein information is provided in the profile and the information includes relevant characteristics of corresponding end users;
    provide a first end user with one or more questions; and
    provide the questions to a second end user whose profile has already been matched to the first end user's profile, whereby answers for the questions from the first and second end users are compared and a subsequent message is sent to the first end user if the answers provided by the first end user and the second end user are determined to be compatible, which is indicative of responses that could be either similar or dissimilar, or exact, and wherein the subsequent message highlights a first answer by the first end user that is compatible with a second answer by the second end user and wherein, by clicking on the subsequent message, the first end user is taken into a profile detail of the second end user.

15. The logic of claim 14, wherein the questions are presented to the first end user via a floating screen module.

16. The logic of claim 15, wherein the floating screen module is delivered to the first end user when the first end user logs into a central website.

17. The logic of claim 14, wherein the questions are provided on an electronic dashboard displayed to the first end user.

18. The logic of claim 14, wherein the questions are provided in an e-mail communication to the end user.

19. The logic of claim 14, wherein inactivity by the first end user triggers the questions being asked of the first end user.

20. The logic of claim 14, wherein the first end user and second end user were previously matched and shown to the first end user on an electronic dashboard before the questions were asked of the first end user.

21. The apparatus of claim 1, wherein the subsequent message includes a clickable link to the profile detail of the second end user.

22. The method of claim 9, wherein the subsequent message includes a clickable link to the profile detail of the second end user.

23. The logic of claim 14, wherein the subsequent message includes a clickable link to the profile detail of the second end user.

* * * * *